United States Patent
Greene

(10) Patent No.: US 10,049,515 B2
(45) Date of Patent: Aug. 14, 2018

(54) TRUSTED USER IDENTIFICATION AND MANAGEMENT FOR HOME AUTOMATION SYSTEMS

(71) Applicant: Echostar Technologies L.L.C., Englewood, CO (US)

(72) Inventor: Gregory Greene, Littleton, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 0 days.

(21) Appl. No.: 15/246,079

(22) Filed: Aug. 24, 2016

(65) Prior Publication Data

US 2018/0061158 A1    Mar. 1, 2018

(51) Int. Cl.
G06K 9/00 (2006.01)
G07C 9/00 (2006.01)

(52) U.S. Cl.
CPC ..... G07C 9/00158 (2013.01); G06K 9/00255 (2013.01); G06K 9/00295 (2013.01); G06K 9/00711 (2013.01); G06K 9/00771 (2013.01); G06K 9/00926 (2013.01)

(58) Field of Classification Search
CPC .......... G07C 9/00158; G06K 9/00295; G06K 9/00288; G06K 9/6255; G06F 17/30793; G06F 21/32; G08B 13/196
USPC ........................................ 382/118
See application file for complete search history.

(56) References Cited

U.S. PATENT DOCUMENTS

| | | | |
|---|---|---|---|
| 4,127,966 A | 12/1978 | Schmidt | |
| 4,386,436 A | 5/1983 | Kocher et al. | |
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |

(Continued)

FOREIGN PATENT DOCUMENTS

| | | |
|---|---|---|
| CA | 2 267 988 A1 | 4/1998 |
| CN | 105814555 A | 7/2016 |

(Continued)

OTHER PUBLICATIONS

Fong A. C. M. et al, "Indoor air quality control for asthma patients using smart home technology," Consumer Electronics (ISCE), 2011 IEEE 15th International Symposium On, IEEE, Jun. 14, 2011, pp. 18-19, XP032007803, DOI: 10.1109/ISCE.2011.5973774, ISBN: 978-1-61284-843-3, Abstract and sections 3 and 4.

(Continued)

*Primary Examiner* — Iman K Kholdebarin

(74) *Attorney, Agent, or Firm* — Kilpatrick Townsend & Stockton LLP

(57) ABSTRACT

Various arrangements for determining and setting an authorization level for an unknown person are presented. Facial recognition may be performed on a received video stream. An authorized user may be recognized in the video feed. Additionally, an unknown person may be identified in the video feed. A provisional authorization level may be granted for the unknown person based on proximity between the unknown person and the authorized user in the received video stream.

17 Claims, 11 Drawing Sheets

(56) References Cited

U.S. PATENT DOCUMENTS

| | | |
|---|---|---|
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A * | 8/2000 | Atick ............... G06F 21/32 340/5.83 |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,081,830 B2 | 7/2006 | Shimba et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,533,144 B1 * | 9/2013 | Reeser ............... G06Q 30/02 705/14.53 |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 * | 2/2016 | Chen ............... H04N 21/43615 |
| 9,286,482 B1 * | 3/2016 | Dumont ............... G06F 21/32 |
| 9,338,054 B2 * | 5/2016 | Russell ............... G06Q 30/0631 |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 * | 9/2017 | McCarthy, III ........ G05B 15/02 |
| 9,798,309 B2 | 10/2017 | Tirpak |
| 9,824,578 B2 * | 11/2017 | Burton ............... G08C 17/02 |
| 9,835,434 B1 * | 12/2017 | Sloo ............... G01B 7/02 |
| 9,838,736 B2 * | 12/2017 | Smith ............... H04N 21/43615 |
| 9,882,736 B2 | 1/2018 | Lett |
| 9,888,129 B2 * | 2/2018 | Russell ............... H04M 15/8016 |
| 9,900,177 B2 * | 2/2018 | Holley ............... H04L 12/2825 |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |

(56) References Cited

U.S. PATENT DOCUMENTS

| | | |
|---|---|---|
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1* | 8/2005 | Campbell .............. G06F 21/32 715/742 |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |

(56) References Cited

U.S. PATENT DOCUMENTS

| | | |
|---|---|---|
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1* | 10/2014 | Ricci ............... B60Q 1/00 340/901 |
| 2014/0310075 A1 | 10/2014 | Ricci |
| 2014/0313014 A1 | 10/2014 | Huh et al. |
| 2014/0313032 A1* | 10/2014 | Sager ............... H04Q 9/00 340/539.17 |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1 | 10/2015 | Warren |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1* | 4/2016 | Kim ............... G06F 11/0709 714/47.1 |
| 2016/0100696 A1* | 4/2016 | Palashewski .......... A47C 31/00 700/90 |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1* | 6/2016 | Peterson ............... G08B 25/008 340/541 |
| 2016/0191912 A1 | 6/2016 | Lea et al. |
| 2016/0191990 A1 | 6/2016 | McCarthy |
| 2016/0195856 A1* | 7/2016 | Spero ............... G06N 5/046 700/90 |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1* | 11/2016 | Khot ............... G06F 3/04842 |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0041886 A1 | 2/2017 | Baker et al. |

(56) References Cited

U.S. PATENT DOCUMENTS

| | | |
|---|---|---|
| 2017/0048476 A1 | 2/2017 | Freiin von Kapri et al. |
| 2017/0051925 A1 | 2/2017 | Stefanski et al. |
| 2017/0054615 A1 | 2/2017 | Wilson |
| 2017/0065433 A1 | 3/2017 | Gould et al. |
| 2017/0082987 A1 | 3/2017 | Reddy et al. |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |
| 2018/0027290 A1 | 1/2018 | Richardson |
| 2018/0038029 A1 | 2/2018 | Beals |

FOREIGN PATENT DOCUMENTS

| | | | |
|---|---|---|---|
| EP | 2 736 027 A1 | 5/2014 | |
| EP | 3 080 677 A1 | 10/2016 | |
| EP | 3 080 710 A1 | 10/2016 | |
| GB | 2 304 952 A | 3/1997 | |
| JP | 2008148016 A | 6/2008 | |
| WO | 93/20544 A1 | 10/1993 | |
| WO | 2004/068386 A1 | 8/2004 | |
| WO | 2011/095567 A1 | 8/2011 | |
| WO | 2011/149473 A1 | 12/2011 | |
| WO | 2014/068556 A1 | 5/2014 | |
| WO | 2015/179120 A1 | 11/2015 | |
| WO | 2016/034880 A1 | 3/2016 | |
| WO | 2016/066399 A1 | 5/2016 | |
| WO | 2016/066442 A1 | 5/2016 | |
| WO | 2016/182696 A1 | 11/2016 | |
| WO | 2017/116533 A1 | 7/2017 | |
| WO | 2018/039161 A1 | 3/2018 | |

OTHER PUBLICATIONS

Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
International Search Report and Written Opinion for PCT/US2014/053876 dated Nov. 26, 2014, 8 pages.
International Preliminary Report on Patentability for PCT/US2014/053876 dated Jun. 14, 2016, 7 pages.
International Search Report and Written Opinion for PCT/US2014/055441 dated Dec. 4, 2014, 10 pages.
International Preliminary Report on Patentability for PCT/US2014/055441 dated Jun. 14, 2016, 8 pages.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
International Search Report and Written Opinion for PCT/US2016/028126 dated Jun. 3, 2016, all pages.

Lamonica, M., "CES 2010 Preview: Green comes in many colors," retrieved from CNET.com (http://ces.cnet.com/8301-31045_1-10420381-269.html), Dec. 22, 2009, 2 pages.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart_tv_television_apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
Robbins, Gordon, Deputy Chief, "Addison Fire Department Access Control Installation," 2006 International Fire Code, Section 1008.1.3.4, 4 pages.
"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/ . . . /New_IBC-IFC_Code_Language.pdf.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
U.S. Appl. No. 14/470,352, filed Aug. 27, 2014, Non Final Office Action dated Nov. 20, 2015, 28 pages.
U.S. Appl. No. 14/470,352, filed Aug. 27, 2014, Final Office Action dated Mar. 17, 2016, all pages.
U.S. Appl. No. 14/470,352, filed Aug. 27, 2014, Non Final Office Action dated Aug. 26, 2016, all pages.
U.S. Appl. No. 14/470,352, filed Aug. 27, 2014, Notice of Allowance dated Dec. 2, 2016, all pages.
International Search Report and Written Opinion for PCT/GB2015/052457 dated Nov. 13, 2015, 11 pages.
International Search Report and Written Opinion for PCT/US2014/055476 dated Dec. 30, 2014, 10 pages.
International Preliminary Report on Patentability for PCT/US2014/055476 dated Jun. 14, 2016, 9 pages.
U.S. Appl. No. 15/050,958, filed Feb. 23, 2016, Notice of Allowance dated Dec. 6, 2016, all pages.
U.S. Appl. No. 15/289,395 filed Oct. 10, 2016, Non-Final Rejection dated Dec. 2, 2016, all pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010, Non-Final Office Action dated Apr. 1, 2013, 16 pages.
U.S. Appl. No. 12/700,310, filed Feb. 4, 2010, Non-Final Office Action dated Oct. 15, 2013, 15 pages.
U.S. Appl. No. 12/700,310 filed Feb. 4, 2010, Final Office Action dated Feb. 28, 2014, 17 pages.
U.S. Appl. No. 12/700,310, filed Feb. 4, 2010, Non-Final Office Action dated Aug. 14, 2014, 18 pages.
U.S. Appl. No. 12/700,310, filed Feb. 4, 2010, Non-Final Office Action dated Mar. 11, 2015, 35 pages.

(56) References Cited

OTHER PUBLICATIONS

U.S. Appl. No. 12/700,310, filed Feb. 4, 2010, Final Office Action dated Oct. 26, 2015, 19 pages.
U.S. Appl. No. 12/700,310, filed Feb. 4, 2010, Non-Final Office Action dated Jun. 16, 2016, 30 pages.
U.S. Appl. No. 12/700,310, filed Feb. 4, 2010, Notice of Allowance dated Nov. 8, 2016, all pages.
U.S. Appl. No. 14/528,739, filed Oct. 30, 2014, Notice of Allowance dated Jun. 23, 2016, 34 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/107,132, filed Dec. 16, 2013, Final Rejection dated Dec. 16, 2015, 32 pages.
U.S. Appl. No. 14/107,132, filed Dec. 16, 2013, Non Final Office Action dated Jul. 18, 2016, all pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
U.S. Appl. No. 14/485,188, filed Sep. 12, 2014, Final Rejection dated Feb. 23, 2016, 22 pages.
U.S. Appl. No. 14/485,188, filed Sep. 12, 2014, Non-Final Rejection dated Jun. 17, 2016, 29 pages.
U.S. Appl. No. 14/485,188, filed Sep. 12, 2014, Final Rejection dated Nov. 25, 2016, 22 pages.
U.S. Appl. No. 14/567,348, filed Dec. 11, 2014, Preinterview first office action dated Jan. 20, 2016, 23 pages.
U.S. Appl. No. 14/567,765 filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/584,075, filed Dec. 29, 2014, Final Rejection dated Oct. 6, 2016, all pages.
U.S. Appl. No. 14/710,331, filed May 12, 2015, Non-Final Rejection dated May 20, 2016, 42 pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
International Preliminary Report on Patentability for PCT/GB2015/052544 dated Mar. 7, 2017, all pages.
Notification of Publication of European Application No. 162004220 as EP 3166308 on May 10, 2017, 2 pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/671,299, filed Mar. 27, 2015, Notice of Allowance dated Apr. 17, 2017, all pages.
U.S. Appl. No. 14/476,377, filed Sep. 3, 2014, Notice of Allowance dated May 19, 2017, all pages.
U.S. Appl. No. 15/075,412 filed Mar. 21, 2016, Final Rejection dated Apr. 17, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 15/289,395, filed Oct. 10, 2016, Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of Brazilian Application No. BR 11 2016 0112032 dated Aug. 8, 2017, 2 pages.
Supplementary European Search Report for EP 14868928 dated Jul. 7, 2017, 11 pages.
Notification of Publication of European Application No. 15763643.2 as EP 3189511 on Jul. 12, 2017, 1 page.
Notification of Publication of Brazilian Application No. BR 11 2016 010376 9 dated Aug. 8, 2017, 1 page.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014, Preinterview first office action dated Oct. 6, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Search Report and Written Opinion for PCT/US2016/057729 dated Mar. 28, 2017, all pages.
European Search Report for EP 16 20 0422 dated Jan. 13, 2017, all pages.
International Preliminary Report on Patentability for PCT/GB2015/052457 dated Feb. 28, 2017, all pages.
U.S. Appl. No. 14/107,132, filed Dec. 16, 2013, Notice of Allowance dated Jan. 18, 2017, all pages.
U.S. Appl. No. 14/567,765, filed Dec. 11, 2014, Final Rejection dated Feb. 16, 2017, all pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.

(56) References Cited

OTHER PUBLICATIONS

U.S. Appl. No. 15/075,412, filed Mar. 21, 2016, Non Final Rejection dated Dec. 21, 2016, all pages.
U.S. Appl. No. 14/497,130, filed Sep. 25, 2014, Non Final Rejection dated Feb. 8, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/565,853, filed Dec. 10, 2014, Non Final Rejection dated Mar. 10, 2017, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
Mark Edward Soper, "Absolute Beginner's Guide to Home Automation," 2005, Que Publishing, p. 57, 121.
U.S. Appl. No. 14/982,366 filed Dec. 29, 2015, Non-Final Rejection dated Nov. 1, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
U.S. Appl. No. 14/981,501, filed Dec. 28, 2015, Final Office Action dated Oct. 10, 2017, all pages.
Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/528,402, filed Oct. 30, 2014, Notice of Allowance dated Jan. 29, 2018, all pages.
U.S. Appl. No. 14/970,235, Non Final Rejection dated Jan. 31, 2018, all pages.

* cited by examiner

TRUSTED USER IDENTIFICATION AND MANAGEMENT FOR HOME AUTOMATION SYSTEMS

CROSS-REFERENCES TO RELATED APPLICATIONS

This Application is related to U.S. patent application Ser. No. 15/246,259, entitled "Systems and Methods for Suppressing Unwanted Home Automation Notifications" filed on the same day as this application, the entire disclosure of which is hereby incorporated by reference for all purposes.

BACKGROUND

Home automation systems allow users to receive various forms information related to their homes and activity in and around their homes. For instance, when motion is detected at a home, a home automation system may send a notification to a defined user informing him of the motion. Such information can be useful to the user, such as if he was not expecting any motion or visitors while he was away from home. For example, if a stranger is detected on video, a user may desire to known about the presence of the stranger. However, a notification may be triggered by a person who is allowed to be in a particular location. For instance, a visiting relative, friend, or tradesman may trigger a movement notification to be sent to a user. Such a "false positive" (that is, a notification about an occurrence that a user is not interested in) can annoy a user and result in information fatigue. Such a situation can result in a user ignoring notifications and, potentially, missing useful notifications.

SUMMARY

Various arrangements, including systems, devices, and methods, for determining and setting an authorization level for an unknown person are presented. A home automation host system may store a database of users. Each user may be linked with stored visual identification data used to identify the user in received video and the authorization level. A video stream may be received by the home automation host system from a video camera. Facial recognition may be performed on a plurality of persons that appear in the video stream. From the plurality of persons that appear in the video stream, an authorized user may be identified based on stored visual identification from the stored database of users. From the plurality of persons that appear in the video stream, identifying a person as unknown. A record may be created for the unknown person in the database of users based on identifying the unknown person. A provisional authorization level may be set for the unknown person based on proximity between the unknown person and the authorized user in the received video stream. The provisional authorization level may alter a distribution of notifications related to the unknown person.

Such arrangements may include one or more of the following features: The proximity between the unknown person and the authorized user may be a temporal proximity and the temporal proximity between the unknown person and the authorized user in the video stream is determined to be less than a threshold period of time. The proximity between the unknown person and the authorized user may be a physical proximity and the authorized user and the unknown person are determined appear in a field of view of the video camera at a same time. An image of the unknown person may be captured from the received video stream. The image of the unknown person may be stored as part of the created record for the unknown person in the database of users. The created record for the unknown person may be output to a mobile device for presentation including the image of the unknown person from the record. A request that requests the authorized user input an updated authorization level for the unknown person may be transmitted. A response to the request may be received, the response comprising an indication of an updated authorization level for the unknown person. The created record for the unknown person may be modified to indicate the updated authorization level provided in the response to the request. Transmission of a notification indicating the presence of the unknown person may be suppressed based on the unknown person having been granted at least the temporary authorized status based on the proximity between the unknown person and the authorized user in the received video stream. Recording of the video stream may be ceased based on the unknown person having been granted at least the temporary authorized status based on the proximity between the unknown person and the authorized user.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When an unknown person is detected at a home, the unknown person's proximity, in time and/or distance, to an authorized user may be used to provisionally grant the unknown person authorization at the home, such as in relation to various home automation devices. For example, if a guest is in a same room as an authorized user, the authorized user is aware of the guest and likely has some personal or business relationship with the guest. Based on this relationship, the authorized user would likely not want to receive notifications regarding the behavior of the guest, at least for some period of time. Based on the guest or some other unknown person being detected by a video camera in physical or temporal proximity to an authorized user, the unknown person may be granted a temporary or provisional authorization that causes the home automation host to: suppress the transmission of notifications related to the unknown person, cease recording of video of the unknown person's action may be ceased, and/or alter the control of other home automation devices.

In some embodiments, when video of an unknown person is captured, an image of the unknown person may be transmitted to a mobile device of an authorized user. An interface may be presented that presents: when the unknown person was detected, the image of the unknown person, and an interface for the authorized user to select an authorization level for the unknown person. In some embodiments, in an attempt to gather more information about the unknown person, mobile devices and contact lists may be leveraged. An authorized user may provide a home automation host system or home automation application executed by the mobile device with access to his mobile device's contact list. The home automation host or application may acquire various identifiers (e.g., phone numbers, usernames) from the contact list and associated information, such as a contact's name. When an unknown person is detected, an identifier may be acquired from the unknown person's mobile device. The acquired identifiers from the authorized user's contact list may be searched for the identifier from the unknown person's mobile device. If a match is located, the contact's name and, possibly, other biographical information may be linked with the unknown person, such as for display as part of an interface requesting an authorization level for the unknown person.

It should be understood that while this document refers to "home" automation devices and "homes," it should be understood that the principles detailed herein are applicable to wireless sensors, devices, and person monitoring that can be installed at locations other than homes, such as businesses, airports, office buildings, warehouses, etc.

Figure 1:
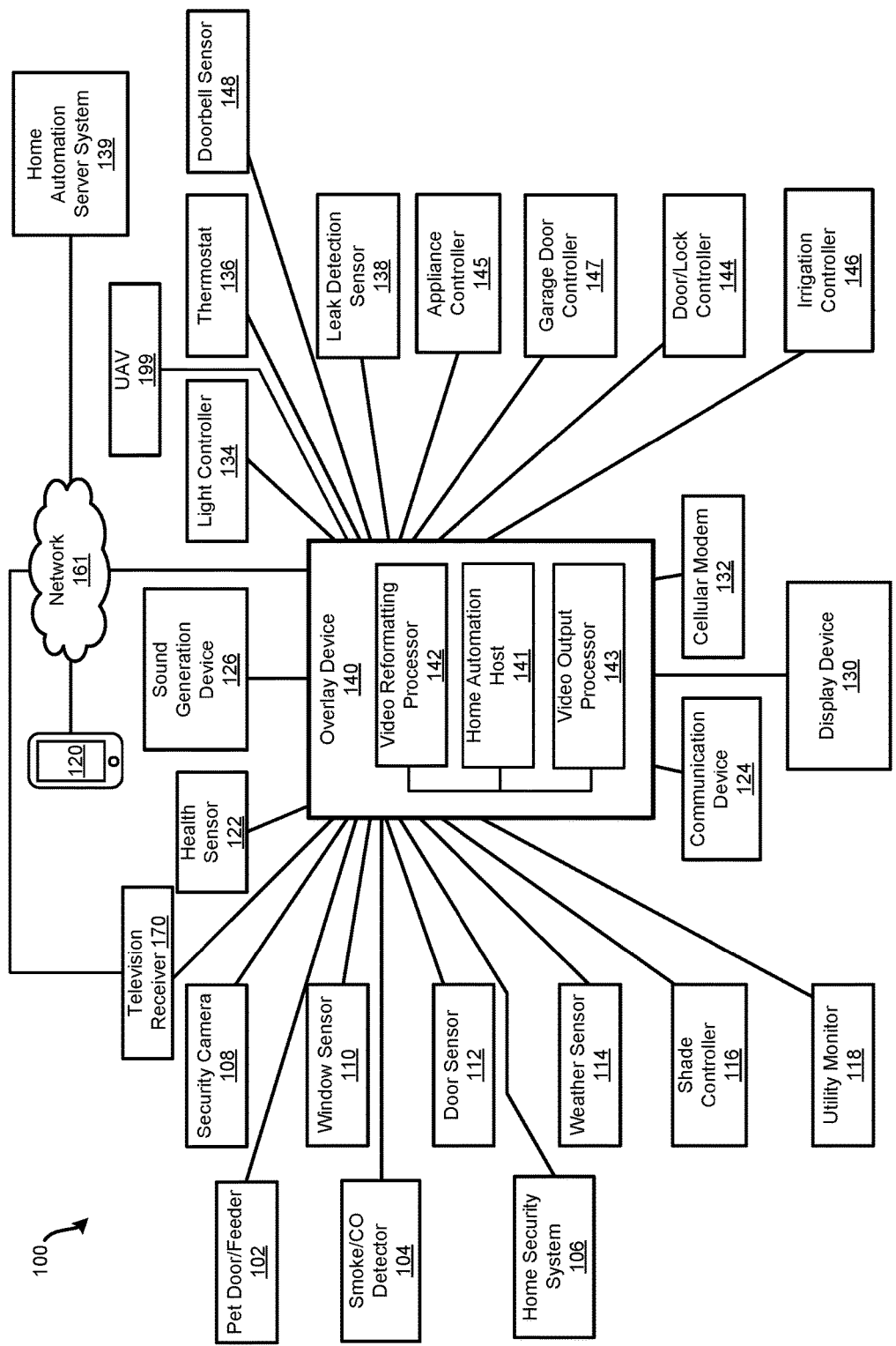
FIG. 1 illustrates an embodiment of a home automation system.

Detail regarding the above various embodiments of methods and systems that can be used for determined an authorization level for an unknown person are detailed in relation to the Figures. FIG. 1 illustrates an embodiment of a home automation system that can performed trusted user identification based on proximity to an authorized user. FIG. 1 illustrates an embodiment of a home automation system 100 hosted by an overlay device 140. As such, in home automation system 100, overlay device 140 functions as the home automation host system. Overlay device 140 refers to a device that can be connected with a separate display device 130, such that information regarding the home automation system is presented by display device 130. In some embodiments, overlay device 140 receives data from a separate device, such as television receiver 170, and overlays home automation data and user interfaces over television signals (e.g., television programming) output by television receiver 170. Television receiver 170 may be configured to receive television programming from a satellite-based television service provider; in other embodiments, other forms of television service provider networks may be used, such as an IP-based network (e.g., fiber network), a cable based network, a wireless broadcast-based network, etc.

In some embodiments, overlay device 140 may be coupled between television receiver 170, which may be in the form of a set top box (STB), and display device 130, which may be a television. In such embodiments, television receiver 170 may receive, decode, descramble, decrypt, store, and/or output television programming. Television receiver 170 may output a signal, such as in the form of an HDMI signal. Rather than be directly input to display device 130, the output of television receiver 170 may be input to overlay device 140. Overlay device 140 may receive the video and/or audio output from television receiver 170. Overlay device 140 may reformat and/or add additional information to the video and/or audio signal received from television receiver 170. The modified video and/or audio signal may be output to display device 130 for presentation. In some embodiments, overlay device 140 has an HDMI input and an HDMI output, with the HDMI output being connected to display device 130.

In FIG. 1, overlay device 140 includes video reformatting processor 142, home automation host 141, and video output processor 143. While video reformatting processor 142 and video output processor 143 may be implemented using separate processors, it should be understood that the functionality of these blocks may be performed by a single processor or processing device. Video reformatting processor 142 may receive video from an external source, such as television receiver 170. This video may be reformatted, such as by being changed to a different resolution, and an output video signal is formatted such that the video is only output for display in a particular portion of a display device's screen. Home automation host 141 may output home automation information, such as information related to any of the connected home automation devices of FIG. 1. Video output processor 143 may combine video reformatted by video reformatting processor 142 and home automation data from home automation host 141 for output to display device 130.

In the illustrated embodiment of FIG. 1, overlay device 140 serves as a home automation host system. In other embodiments, it should be understood that television receiver 170 may serve as the home automation host system. Therefore, in other embodiments, functionality attributed to overlay device 140 may instead be fully or partially implemented by television receiver 170. In still other embodiments, a different device, such as a dedicated computerized home automation host device, or another device illustrated as part of home automation system 100, can serve as the home automation host system. For example, a hub (e.g., in-wall unit) of home security system 106 may serve as the home automation host system. Throughout this description of home automation system 100, various host functionality is attributed to overlay device 140 and/or television receiver 170. It should be understood that such home automation functionality may instead be imparted to a dedicated home automation host system or some other home automation device that has home automation host functionality built in.

Overlay device 140 may be configured to communicate with multiple home automation devices. The devices with which overlay device 140 communicates may use different communication standards, including both wireless and wired communication standards. For instance, one or more devices may use a low-power wireless network communication protocol, such as ZigBee® while one or more other devices communicate using Z-Wave®. Other forms of local wireless communication may be used by devices and overlay device 140. For instance, overlay device 140 and one or more devices may be configured to communicate using a wireless local area network, which may use a communication protocol such as IEEE 802.11.

Using overlay device 140 to present automation information via display device 130 may have additional benefits. For instance, multiple devices may provide input video to overlay device 140. For instance, television receiver 170 may provide television programming to overlay device 140, a DVD/Blu-Ray® player may provide stored content to overlay device 140, and a separate internet-TV device may stream other programming to overlay device 140. Regardless of the source of the video/audio, overlay device 140 may output video and/or audio that has been modified to include home automation information and output to display device 130. As such, in such embodiments, regardless of the source of video/audio, overlay device 140 may modify the audio/video to include home automation information and, possibly, solicit for user input. For instance, in some embodiments, overlay device 140 may have four video inputs (e.g., four HDMI inputs) and a single video output (e.g., an HDMI output). In other embodiments, such overlay functionality may be part of television receiver 170. As such, a separate device, such as a Blu-ray® player, may be connected with a video input of television receiver 170, thus allowing television receiver 170 to overlay home automation information when content from the Blu-Ray® player is being output to display device 130.

Regardless of whether television receiver 170 is itself configured to provide home automation functionality and output home automation input for display via display device 130 or such home automation functionality is provided via overlay device 140, home automation information may be presented by display device 130 while television programming is also being presented by display device 130. For instance, home automation information may be overlaid or may replace a portion of television programming (e.g., broadcast content, stored content, on-demand content, etc.) presented via display device 130.

In some embodiments, a separate device may be connected with overlay device 140 to enable communication with home automation devices. For instance, communication device 124 may be in communication with overlay device 140. Communication device 124 may be in the form of a dongle. Communication device 124 may be configured to allow for Zigbee®, Z-Wave®, and/or other forms of (low-power) wireless or wired communication. The communication device may connect with overlay device 140 via a USB port or via some other type of (wired) communication port. Communication device 124 may be powered by the overlay device (or television receiver, if the television receiver is serving as the home automation host system) or may be separately coupled with a power source. In some embodiments, overlay device 140 may be enabled to communicate with a local wireless network and may use communication device 124 in order to communicate with devices that use a ZigBee® communication protocol, Z-Wave® communication protocol, and/or some other home wireless communication protocols.

Communication device 124 may also serve to allow additional components to be connected with overlay device 140 or television receiver 170. For instance, communication device 124 may include additional audio/video inputs (e.g., HDMI), a component, and/or a composite input to allow for additional devices (e.g., Blu-ray players) to be connected with television receiver 170 and/or overlay device 140. Such connection may allow video from such additional devices to be overlaid with home automation information. Whether home automation information is overlaid onto video may be triggered based on a user's press of a remote control button.

Regardless of whether overlay device 140 uses communication device 124 to communicate with home automation devices, overlay device 140 may be configured to output home automation information for presentation to a user via display device 130, which may be a television, monitor, or other form of device capable of presenting visual information. Such information may be presented simultaneously with television programming received by television receiver 170. Television receiver 170 may also, at a given time, output television programming that may be augmented or replaced by home automation information by overlay device 140. The user may be able to provide input to television receiver 170 and/or overlay device 140 to control the home automation system hosted by either television receiver 170 or by overlay device 140, as detailed below.

Figure 5:
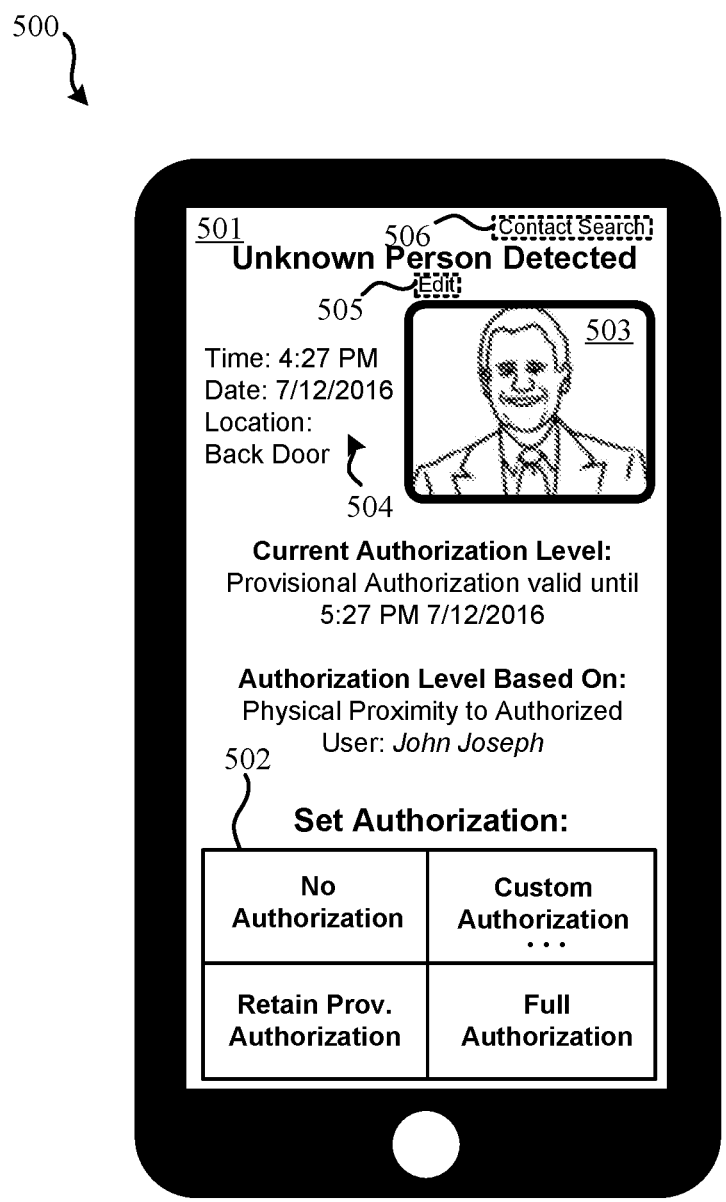
FIG. 5 illustrates an embodiment of a user interface that can be presented via a mobile device to an authorized user that requests authorization level information about an unknown person.

Television receiver 170, overlay device 140, or some other form of home automation host may be configured to communicate with one or more wireless devices, such as (wireless) mobile device 120. Mobile device 120 may represent a tablet computer, cellular phone (e.g., smartphone), laptop computer, remote computer, or some other device through which a user may desire to control home automation settings and view home automation information. For instance, notifications relating to home automation devices may be provided to an authorized user via mobile device 120. Further, an interface, such as illustrated in FIG. 5 may be presented to a user via mobile device 120 (as detailed in relation to FIG. 5). Such a mobile device also need not be wireless, such as a desktop computer. Television receiver 170, communication device 124, or overlay device 140 may communicate directly with mobile device 120, or may use a local wireless network, such as network 161. Mobile device 120 may be remotely located and not connected with a same local wireless network. Via the Internet, television receiver 170 or overlay device 140 may be configured to transmit a notification and/or other information to mobile device 120 regarding home automation information. For instance, in some embodiments, a third-party notification server system, such as the notification server system operated by Apple®, may be used to send push notifications to mobile device 120.

In some embodiments, a location of mobile device 120 may be monitored. A user may be able to define which home automation functions are controlled based on a position of mobile device 120. For example, as detailed within this document, whether a notification is sent may be dependent on a location of a mobile device relative to a home automation sensor for which the notification is pertinent. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 170.

Home automation server system 139 may be in communication with the home automation host via network 161. Information may be exchanged between the home automation host and home automation server system 139. For example, streaming video may be transmitting from overlay device 140 (or whatever device is serving as the home automation host) to home automation server system 139 for storage and/or analysis. In some embodiments, facial recognition is performed by home automation server system 139 rather than the home automation host located at the home.

In some embodiments, little to no setup of network 161 may be necessary to permit television receiver 170, overlay device 140, or some other home automation host to stream data out to the Internet. For instance, television receiver 170 and network 161 may be configured, via a service such as Sling® or other video streaming service, to allow for video to be streamed from television receiver 170 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network," which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network," which is hereby incorporated by reference, describes a system for establishing connection between devices over a network.

Mobile device 120 may serve as an input device for television receiver 170, overlay device 140, or whatever other device is serving as the home automation host. For instance, mobile device 120 may be a tablet computer that allows text to be typed by a user and provided to television receiver 170. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While mobile device 120 may be used as the input device for typing text, television receiver 170 may output for display text to display device 130.

In some embodiments, a cellular modem 132 may be connected with either overlay device 140, television receiver 170, or whatever other home automation device is serving as the home automation host. Cellular modem 132 may be useful if a local wireless network is not available. For instance, cellular modem 132 may permit access to the Internet and/or communication with a television service provider. Communication with a television service provider may also occur via a local wireless or wired network connected with the Internet. In some embodiments, information for home automation purposes may be transmitted by a television service provider system to television receiver 170 or overlay device 140 via the television service provider's distribution network, which may include the use of satellites.

Various home automation (sensor) devices may be in communication with television receiver 170, overlay device 140, or whatever device is serving as the home automation host. Some or all of such home automation devices may function as part of a low-power wireless network mesh network to allow for communication between home automation host 141 and such devices. Such home automation devices may use disparate communication protocols. Such home automation devices may communicate with television receiver 170 directly or via communication device 124. Such home automation devices may be controlled by a user and/or have a status viewed by a user via display device 130 and/or mobile device 120. Home automation devices may include: smoke/carbon monoxide (CO) detector 104, home security system 106, pet door/feeder 102, security camera 108, window sensor 110, irrigation controller 146, weather sensor 114, shade controller 116, utility monitor 118, heath sensor 122, sound generation device 126, light controller 134, thermostat 136, leak detection sensor 138, overlay device 140, appliance controller 145, garage door controller 147, and doorbell sensor 148.

Leak detection sensor 138 may detect the presence of water or the flow of water through a pipe. The presence of water or the excessive flowing of water through the pipe may trigger a message to be transmitted to the home automation host system. Appliance controller 145 may be able to provide status messages about one or more appliances and/or control the functionality of one or more appliances. Garage door controller 147 may provide a status on the position of a garage door (open or closed) and/or may be able to control opening and closing of the garage door. Irrigation controller 146 may be able to provide a status of an irrigation system (on, off, current zone being watered) and may be able to control the irrigation system. Shade controller 116 may be able to provide a status as to the current position of a shade and may be able to control the position of the shade. Window sensor 110 may be able to provide a status as to the current position of a window (open or shut) and may be able to control the position of the window. Sound generation device 126 can allow for sound to be output into the ambient environment of the sound generation device. Light controller 134 may be able to control whether a light is on or off and may be able to provide a status of the light. Pet door/feeder 102 may allow for home automation host 141 to control whether the pet door is locked or unlocked and dispense food. Smoke/CO detector 104 may be combined detector device or separate devices that can detect the presence of smoke and/or CO and provide such a status to home automation host 141. Home security system 106 may be enabled and disabled via home automation host 141 and may provide status information to home automation host 141 (e.g., movement detected, door ajar, glass break, etc.). Weather sensor 114 may provide weather data to home automation host 141. Utility monitor 118 may provide information on the use of utilities (e.g., power, gas, oil, water) to home automation host 141.

Door sensor 112 and lock controller 144 may be incorporated into a single device, such as a door lock and sensor unit, and may allow for a door's position (e.g., open or closed) to be determined and for a lock's state to be determined and changed. Door sensor 112 may transmit data to television receiver 170 or overlay device 140 that indicates the status of a door. Such status may indicate open or closed. When a status change occurs, the user may be notified as such via mobile device 120 or display device 130. Further, a user may be able to view a status screen to view the status of one or more door sensors throughout the location. Window sensor 110 and/or door sensor 112 may have integrated glass break sensors to determine if glass has been broken. Lock controller 144 may permit a door to be locked and unlocked and/or monitored by a user via television receiver 170 or overlay device 140. No mechanical or electrical component may need to be integrated separately into a door or door frame to provide such functionality. Such a single device may have a single power source that allows for sensing of the lock position, for sensing of the door position, and for engagement and disengagement of the lock.

UAV 199 can be capable of streaming video and/or audio gathered outside of a home to display device 130 via overlay device 140 (or television receiver 170) and/or streaming such video and/or audio to a remote server via network 161. Via a service provider's server system, the video and/or audio may be streamed to mobile device 120 or any other remote computerized device through which an authorized user is logged in. In some embodiments, video and/or audio from UAV 199 may be retrieved directly by mobile device 120 from overlay device 140.

Additional forms of sensors not illustrated in FIG. 1 may also be incorporated as part of a home automation system. For instance, a mailbox sensor may be attached to a mailbox to determine when mail is present and/or has been picked up. The ability to control one or more showers, baths, and/or faucets from television receiver 170 and/or mobile device 120 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 170 or overlay device 140 when within range. For instance, when a vehicle has been parked within range of a local wireless network with which the home automation host is connected, video and/or audio may be transmitted from the dashcam to the television receiver for storage and/or uploading to a remote server.

Figure 2:
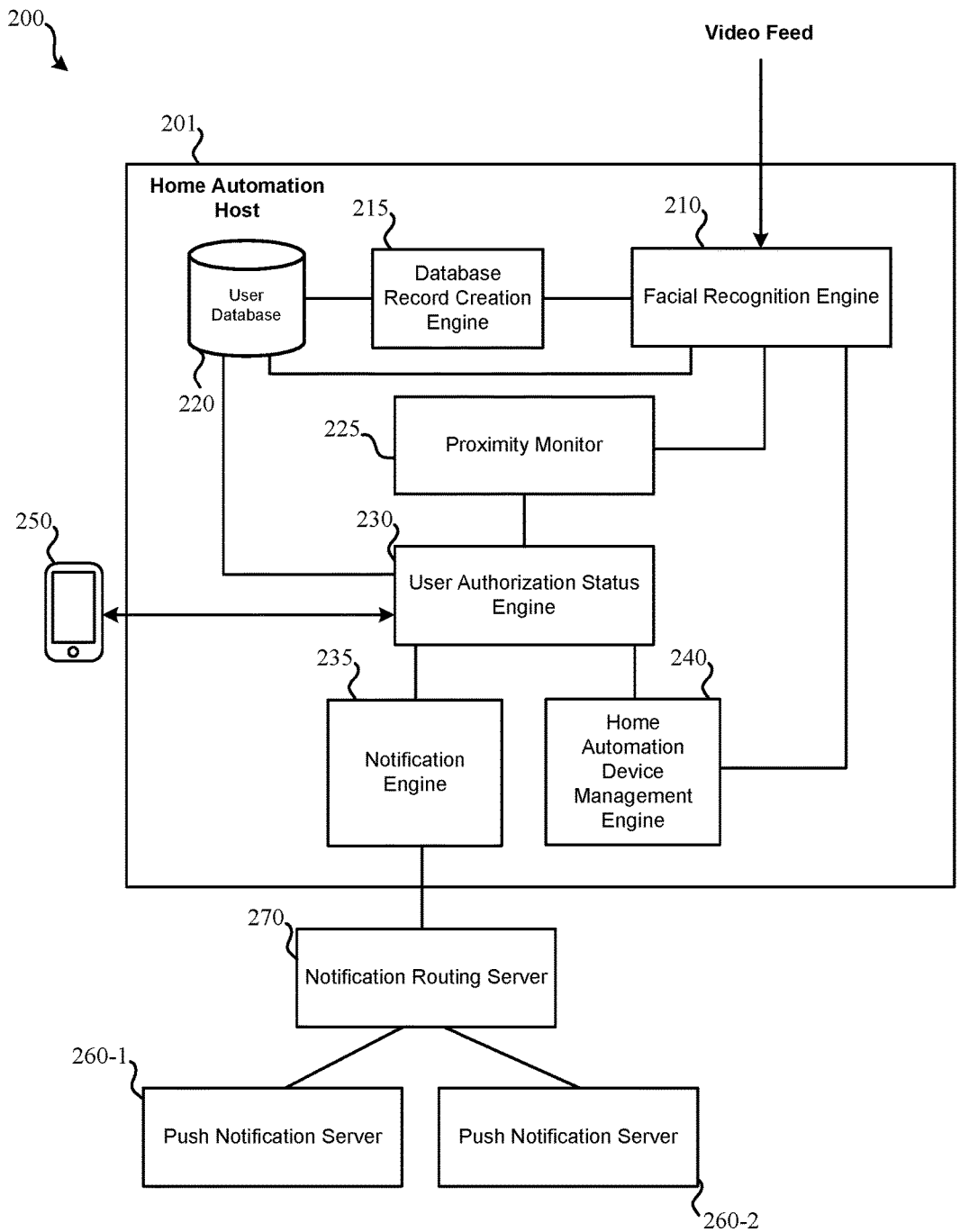
FIG. 2 illustrates an embodiment of a home automation host that manages identification and classification of users.

FIG. 2 illustrates an embodiment of a home automation host system 200 that manages identification and classification of users. Home automation host system 200 can include a home automation host 201 that may represent a hardware, firmware, and/or software implementation that is executed by overlay device 140, television receiver 170, or some other home automation host device. In some embodiments at least a portion of the functionality of home automation host 201 may be performed by home automation server system 139. Home automation host system 200 may include: facial recognition engine 210, database record creation engine 215, user database 220, proximity monitor 225, user authorization status engine 230, notification engine 235, home automation device management engine 240, mobile device 250, push notification servers 260 and notification routing server 270.

Facial recognition engine 210 may receive a video stream from one or more video cameras. Such one or more video cameras may be scattered throughout and/or outside a home being monitored. Facial recognition engine 210 may analyze persons detected in the video feed to determine if one or more faces are recognized based on a match with visual identifying information stored in user database 220. User database 220 may store visual data, such as one or more images or models, of authorized users. User database 220 can also store linked authorization levels for each authorized user. For example, multiple authorization levels may be available and associated with different users. Table 1 represents an example of how entries in user database 220 may be arranged. Each authorization level may have defined characteristics that define how notifications involving the user and/or how home automation devices in the presence of the user are handled.

TABLE 1

| User | Visual Data | Authorization Level |
| --- | --- | --- |
| Joseph John | [model.xxx] | Full Administrator Authorization |

TABLE 1-continued

| User | Visual Data | Authorization Level |
| --- | --- | --- |
| Mary John | [model2.xxx] | User Authorization |
| Unknown person #1 | [model3.xxx] | Temporary Partial Authorization |

In Table 1, visual data, which may be stored in the form of a separate file, is linked with a user name and an authorization level. Specifics of each authorization level may be defined by an authorized user of the home automation host and/or may be defined (e.g., by default) by the service provider via the home automation server system 139. It should be understood that other information may be stored in relation to each user.

User database 220 may also store at least temporary entries for unknown persons. When facial recognition engine 210 is unable to identify a person based on previous entries in user database 220, database record creation engine 215 may create a record for the unknown person. The newly created record may include an image or more than one image captured of the unknown person's face extracted from the video feed using facial recognition engine 210. An unknown person authorization level may be determined by user authorization status engine 230.

Proximity monitor 225 may serve to monitor temporal and/or physical proximity between persons detected using facial recognition engine 210. Proximity determinations made by proximity monitor 225 can be used to determine an authorization level of an unknown person. Proximity monitor 225 may assess physical proximity between an unknown person detected by facial recognition engine 210 and an identified authorized user. Proximity monitor 225 may make a determination that an unknown person and an authorized user are in physical proximity based on both the unknown person and the user being present in a same frame of the video feed. In some embodiments, a distance measurement or estimate between the unknown person and the authorized user is made. If this distance measurement is less than a threshold proximity distance stored by home automation host 201, the unknown person and the authorized user are determined to be in physical proximity. Additionally or alternatively, proximity monitor 225 may make a determination that an unknown person and an authorized user are in temporal proximity based on both the unknown person and the authorized user appearing in a same video feed within a certain amount of time of each other (but not necessarily in any same frame). Proximity monitor 225 may determine whether the unknown person and an authorized user have appeared in a same video feed within a time period of each other that is less than a defined threshold duration or appear in the video stream separated by less than a threshold number of frames. In some embodiments, the unknown person and the authorized user may be required to be detected in a particular order. For example, if an unknown person is detected in the video feed, leaves the camera's field of view, and ten seconds later, and authorized user is detected, the unknown person may be granted at least a temporary or provisional authorization if the threshold duration is greater than ten seconds. In some embodiments, if detection of the authorized user and the unknown person were reversed in order, authorization may not be granted to the unknown user or a different authorization level may be granted.

User authorization status engine 230 may set or alter the authorization level stored using user database 220 and enforced by home automation host 201. Based upon proximity determinations made by proximity monitor 225, user authorization status engine 230 may grant an unknown person at least a provisional or temporary authorization level higher than for an unknown person that was not detected in proximity to an authorized user. For example, in response to an unknown person being determined by proximity monitor 225 of having been in physical and/or temporal proximity to an authorized user, user authorization status engine 230 may update the unknown person's authorization level in the unknown person's record in user database 220 from "none" to "temporary low level authorization." The specific authorization given to an unknown person determined to be in proximity to an authorized user may be based on user-defined or provider-defined preferences. Such a low level authorization may result in only, for example, notifications relating to the unknown person's movement near the home being suppressed from transmission.

User authorization status engine 230 may additionally or alternatively send an authorization request to mobile device 250 associated with an authorized user. Instead of granting an unknown person some level of authorization based on proximity to an authorized user or, possibly, while the unknown person has a temporary or provisional authorization level, user authorization status engine 230 may send a request to a mobile device that requests the authorized user provide an indication of an authorization level to be granted to the unknown person. The authorized user may be designated in user database 220 as the administrator of authorization levels, such as "Joseph John" in Table 1. If the authorized user does not provide a response via mobile device 250, any granted temporary or provisional authorization for the unknown person may expire after a defined period of time. If the authorized user does elect to provide a response, the interface may permit the authorized user to provide additional details regarding the unknown person, such as his or her name, email address, phone number, etc. In some embodiments, the provisional authorization status may renew each time the unknown person meets the conditions of proximity to an authorized user as enforced by the home automation host.

User authorization status engine 230 may further be able to retrieve data from mobile device 250 and other mobile devices, such as those associated with unknown persons. User authorization status engine 230 may access a contact list of an authorized user stored by mobile device 250. From the contact list, identifiers (such as telephone numbers, usernames, MAC address, Bluetooth® IDs), and/or names associated with such identifiers may be retrieved. When a mobile device associated with an unknown person comes within range of home automation host 201, user authorization status engine 230 may retrieve an identifier, such as those previously detailed from the unknown persons mobile device. User authorization status engine 230 may then compare the identifier retrieved from the unknown person's mobile device with identifiers from the contact list of the mobile device associated with the authorized user. If a match is present, information from the contact list may be used to supplement determined information about the unknown person, such as by providing a name to be associated with the unknown person's record in user database 220. Further, information obtained from the contact list may be used to provide additional information to an authorized user about the unknown person in interface, such as that presented in FIG. 5.

Notification engine 235 may serve to transmit notifications to authorized users of home automation events. The notifications that are pushed or otherwise sent to authorized users by notification engine 235 may vary based on an authorization level of the person who is determined to be responsible for an action leading to notification. For example, if an unknown person with no authorization opens a door, notification engine 235 may send a push notification to an authorized user who is defined to receive such notifications. However, if an unknown person who has a temporary authorization based on proximity to an authorized user opens a door, transmission of a notification by notification engine 235 may be suppressed or otherwise not sent. A log entry may be made of the home automation event along with an indication of why the notification was not sent (e.g., due to the unknown person's authorization level) Specifically what actions or events trigger notifications to be transmitted may be based on user-defined preferences and rules set at home automation host 201.

In addition to notifications, how particular home automation devices may be managed or controlled may be based on the authorization levels of users or unknown persons present at the home, not present at the home, and/or detected in the vicinity of such home automation devices. Home automation device management engine 240 may control one or more home automation devices based on the authorization levels of users present or not present at the home or in the vicinity of the home automation devices. For example, if an unknown person is in the field of view of a video camera and the unknown person has no authorization level, the video stream from the video camera may be recorded. In contrast, if an unknown persons in the field of view of the video camera and the unknown person has at least a provisional authorization level based on proximity to an authorized user, the video stream from the video camera may not be recorded. Specifically how various home automation devices have their operation adjusted based on the detected presence of one or more users having different authorization levels and be based on user-defined preferences and/or provider defined preferences.

If a notification is to be transmitted by notification engine 235, notification engine 235 may transmit an indication to notification routing server 270. Notification routing server 270 may be operated by a service provider that provides remote cloud computing services to home automation host 201 (e.g., via home automation server system 139). Notification routing server 270 may then send the home automation notification via a determined route to the mobile device of the user to be notified. If a push notification is to be sent, notification routing server 270 may transmit a push notification request to a push notification server associated with the operating system or manufacturer of the user's mobile device. For example, push notification server 260-1 may process and distribute push notifications for Apple®/iOS® devices and push notification server 260-2 may process and distribute push notifications for Android® devices. If a form of message other than a push notification is to be sent, notification routing server 270 may route the home automation notification via the appropriate route, such as text, recorded message, in-application message (e.g., only visible when the user opens an associated application on his mobile device and the home automation notification is retrieved).

Figure 3A:
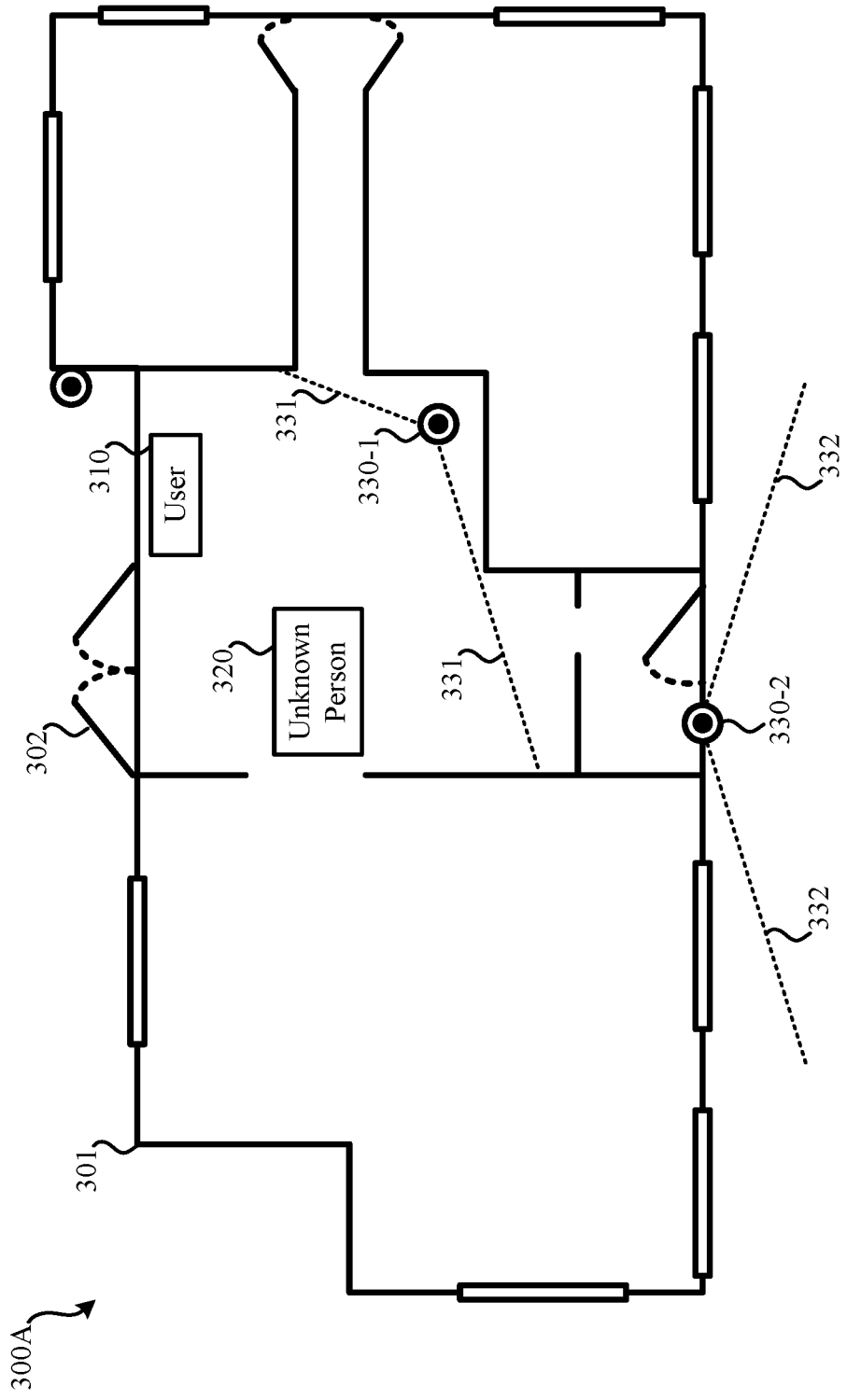
FIGS. 3A and 3B illustrate embodiments of maps indicating how physical proximity can be used to set an unknown person's authorization level.
Figure 3B:
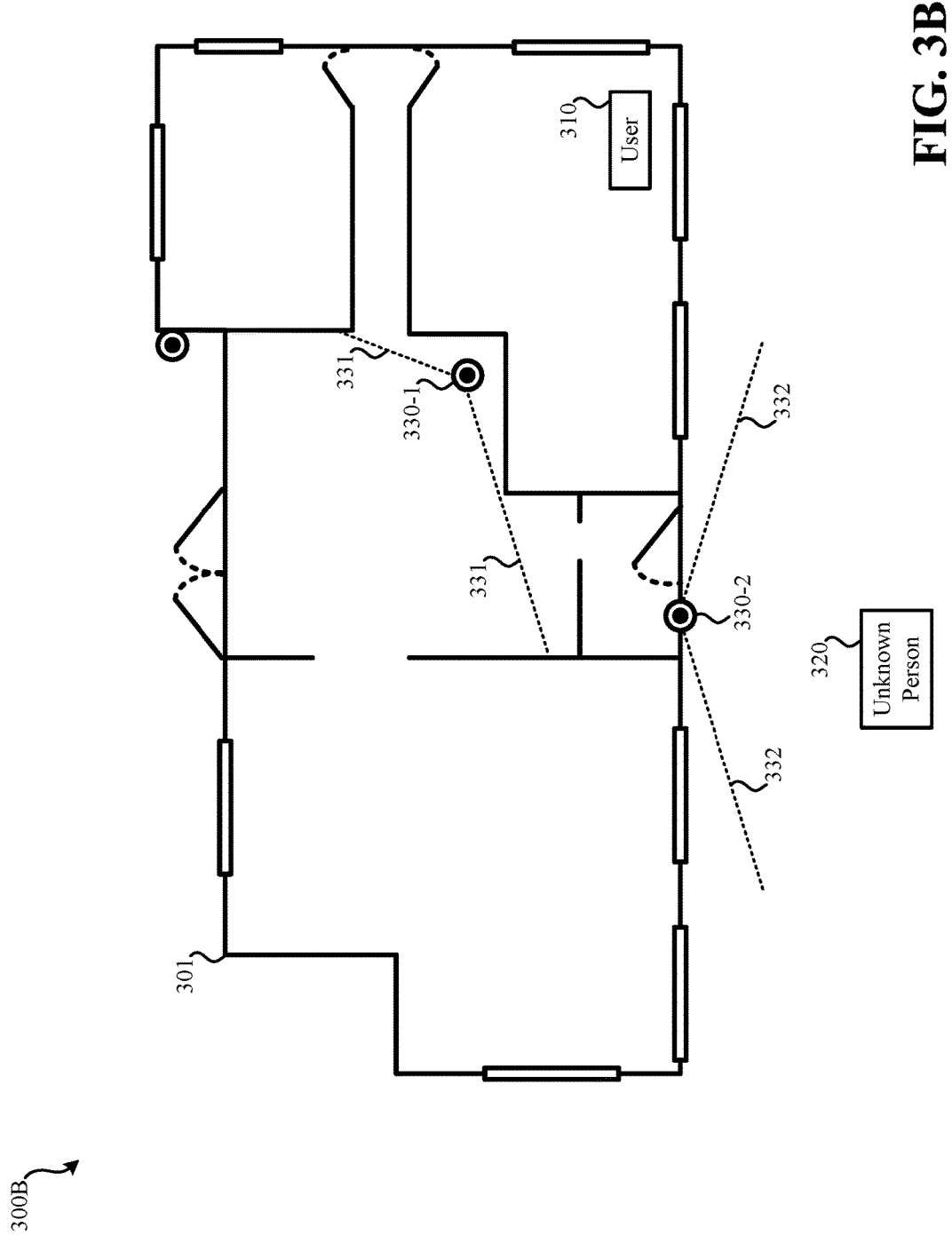

FIGS. 3A and 3B illustrate embodiments of maps indicating how physical proximity can be used to set an unknown person's authorization level. In FIGS. 3A through 4B, a home 301 is illustrated in the form of a floor plan with illustrated windows, doors, and rooms. Locations of video cameras 330 (330-1, 330-2) are illustrated. Video camera 330-1 has a field of view 331. Video camera 330-2 is a field of view 332. Referring to embodiment 300A of FIG. 3A, proximity monitor 225 may determine, based on a video feed from video camera 330-1, that unknown person 320 is in physical proximity to authorized user 310 based on both of the persons being within the field of view of video camera 330-1 at the same time. In some embodiments, a distance between unknown person 320 and authorized user 310 may be estimated or determined by proximity monitor 225. If this distance is less than a predefined threshold, the unknown person may be granted at least some level of temporary authorization. In some embodiments, an additional distance threshold may be used: in order for unknown person 320 to be granted at least a temporary authorization, unknown person 320 may be required to be within a threshold distance of video camera 330-1. Further, in some embodiments, particular regions of the field of view of video camera 330-1 may be excluded from such proximity monitoring. For example, if unknown person 320 was outside of home 301 by doors 302, unknown person 320 may not be granted any form of temporary authorization. Such an arrangement may prevent, for example, a salesman who rings the doorbell of home 301 from being granted temporary authorization rights based on authorized user 310 opening door 302. Such particular exclusions for regions of field of view 331 may be set by an authorized user of the home automation host.

Referring to embodiment 300B of FIG. 3B, unknown person 320 has moved to a rear of the house in the field of view 332 of video camera 330-2 since being in the position of FIG. 3A. Meanwhile, authorized user 310 has moved into another room and is not in the field of view 332 of video camera 330-2. Unknown person 320 being in the field of view 332 may not trigger a notification to be transmitted to an authorized user, such as authorized user 310, because a provisional or temporary authorization level may have been granted to unknown person 320 based on his or her physical proximity to authorized user 310 as illustrated in FIG. 3A. as an example, the situation of FIG. 3B may occur while unknown person 320 has a temporary authorization, such as several minutes after the situation of FIG. 3A.

Figure 4A:
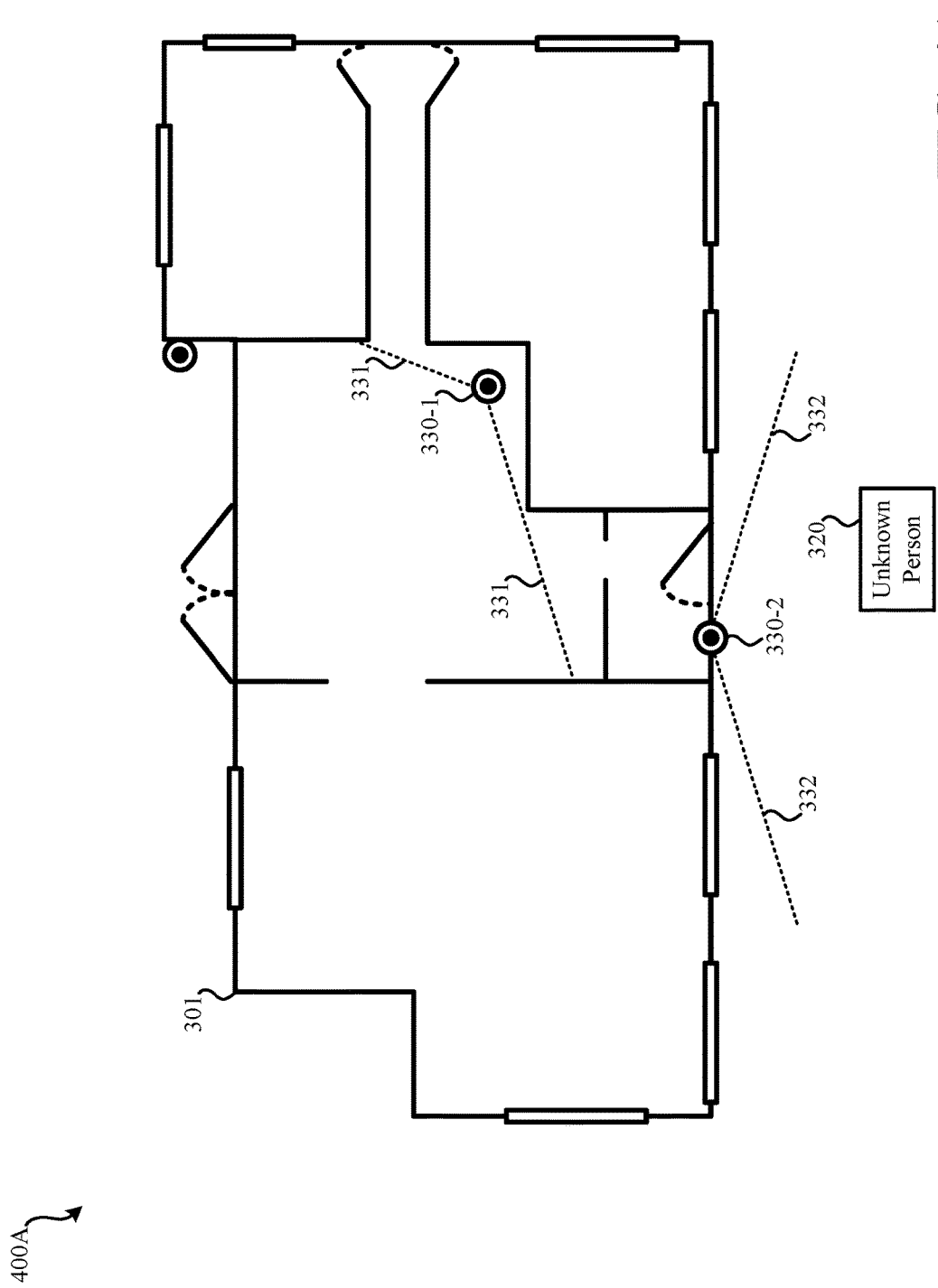
FIGS. 4A and 4B illustrate embodiments of maps indicating how temporal proximity can be used to set an unknown person's authorization level.
Figure 4B:
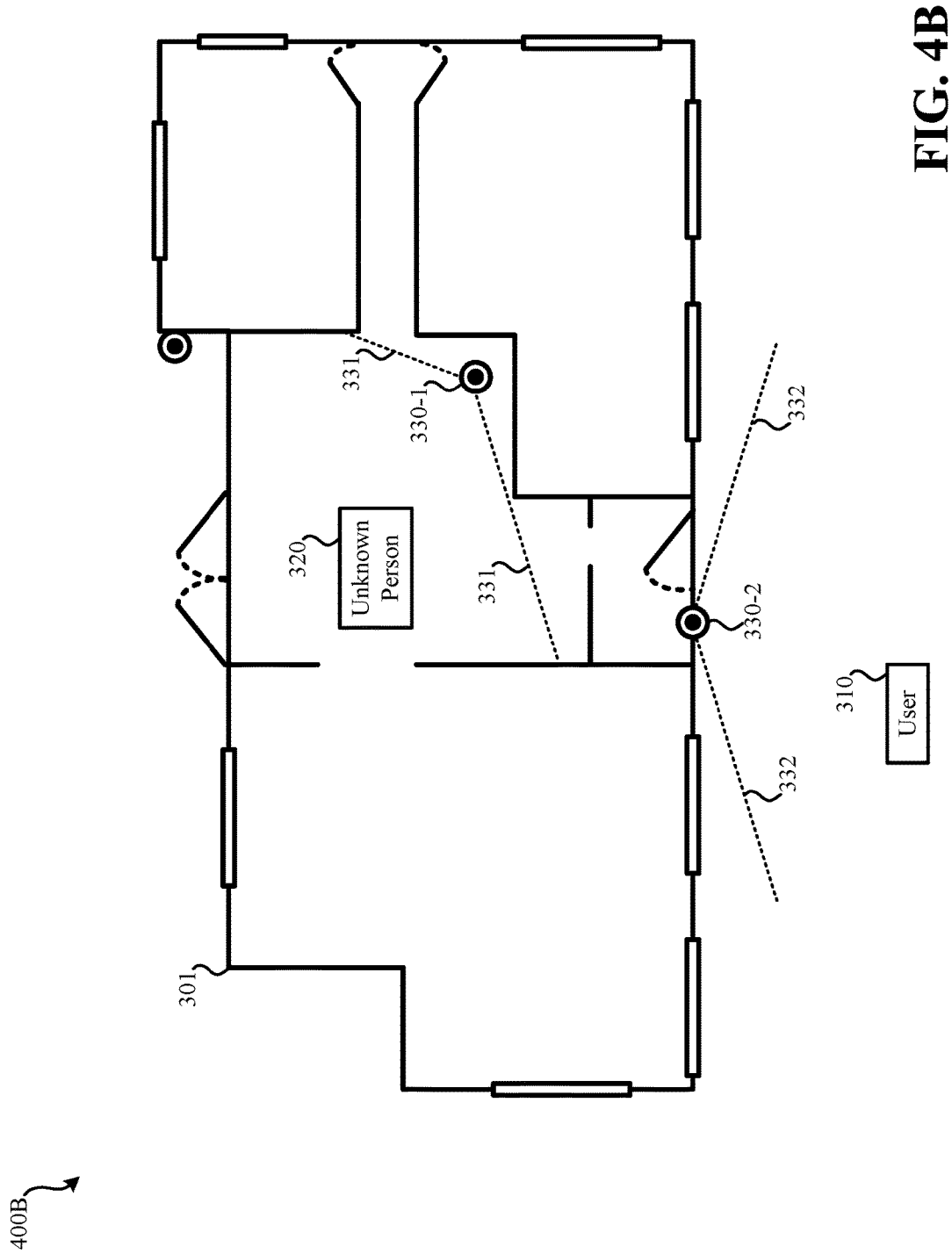

FIGS. 4A and 4B illustrate embodiments of maps indicating how temporal proximity can be used to set an unknown person's authorization level. In FIGS. 4A and 4B, the same home as in FIGS. 3A and 3B are illustrated. In FIG. 4A, unknown person 320 has entered field-of-view 332 of video camera 330-2. No other users or unknown persons may be around. In FIG. 4B, unknown person 320 has left field-of-view 332 of video camera 330-2 and entered the interior of home 301. Within a proximity time duration, such as 15 seconds, stored by the home automation host and set by an authorized user or service provider of the home automation host, authorized user 310 enters field of view 332. By virtue of authorized user 310 passing within field of view 332 within such a short time duration (but not necessarily appearing in any of the same video frames of a video feed output by video camera 330-2), unknown person 320 may be granted a level of authorization. Unknown person 320 being present in field of view 331 may not result in a notification being transmitted, a video feed of video camera 330-1 not being recorded, and/or some other home automation device being managed differently based on unknown person 320 having been provided at least a temporary or provisional level of authorization.

While FIGS. 3A and 3B are focused on physical proximity and FIGS. 4A and 4B are focused on temporal proximity, it should be understood that embodiments may use a combination of these two forms of proximity to provide an unknown person with a provisional level of authorization. For example, unknown person 320 may be required to be detected to be in physical proximity for at least a threshold duration of time and/or appear in video feeds for at least a second duration of time within a threshold period of time of authorized user 310.

FIG. 5 illustrates an embodiment of a user interface 501 that can be presented via a mobile device 500 to an authorized user that requests authorization level information about an unknown person. User interface 501 may be presented to one or more authorized users via home automation system 100. User interface 501 may be presented to an authorized user in various circumstances, such as: 1) immediately after an unknown person has been granted provisional authorization based on proximity; 2) after a defined period of time or at a predefined time of day after an unknown person has been granted provisional authorization based on proximity to an authorized user; 3) prior to an unknown person being granted provisional authorization; and 4) just prior to or when a provisional authorization of an unknown person is set to expire.

Via user interface, an authorized user who has been set at the home automation host to be the authorized user who manages authorization levels, may be presented with: an image 503 of the unknown person, information 504 about when the unknown person was detected, what the unknown person's current authorization level is, and the circumstances about this authorization level (e.g., automatically granted based on proximity to an authorized user, set by another authorized user, etc.). User interface 501 may include a user input section 502 to set or modify the authorization level of the unknown person. The specific authorization levels that can be granted may be based on preferences set at the home automation host system and/or an option may be present on user interface 501 to define a custom authorization. The authorization level selected, if any, may be passed to the home automation host for storage in user database 220 and enforcement by home automation host 201. If no authorization level is selected, the unknown person's current authorization level may continue to be valid until an expiration date/time, if any.

If the authorized user knows the unknown person, edit option 505 may be used by the authorized user to provide information about the unknown person, such as a name, email address, phone number, or any other relevant biographic data. Information provided by the authorized user via edit option 505 may be transmitted to the home automation host and stored in user database 220 in association with a record of the unknown person.

In still other embodiments, contact search 506 may initiate a local search of a contact list stored by mobile device 500. This search may compare an identifier (e.g., a phone number, Bluetooth® ID, image) associated with unknown person with identifiers stored in the contact list of mobile device 500. If a match is located, user interface 501 may be updated as such and/or user database 220 may be updated. Further details regarding such a contact search is detailed in relation to FIG. 8.

It should be understood that the visual arrangement and specific data presented by user interface 501 is merely an example. In alternate embodiments, lesser or greater amounts of information may be presented and possibly in a different format. User interface 501 may be presented as part of an application that executed by mobile device 500. As such, an application or "app" associated with the home automation host or home automation provider may be downloaded to mobile device 500, installed, and linked with the home automation host (e.g., by providing login credentials). The home automation host may be configured to transmit notifications, such as push notifications, to mobile device 500 which cause user interface 501 to be presented when a decision is to be made by the authorized user on an unknown person.

Figure 6:
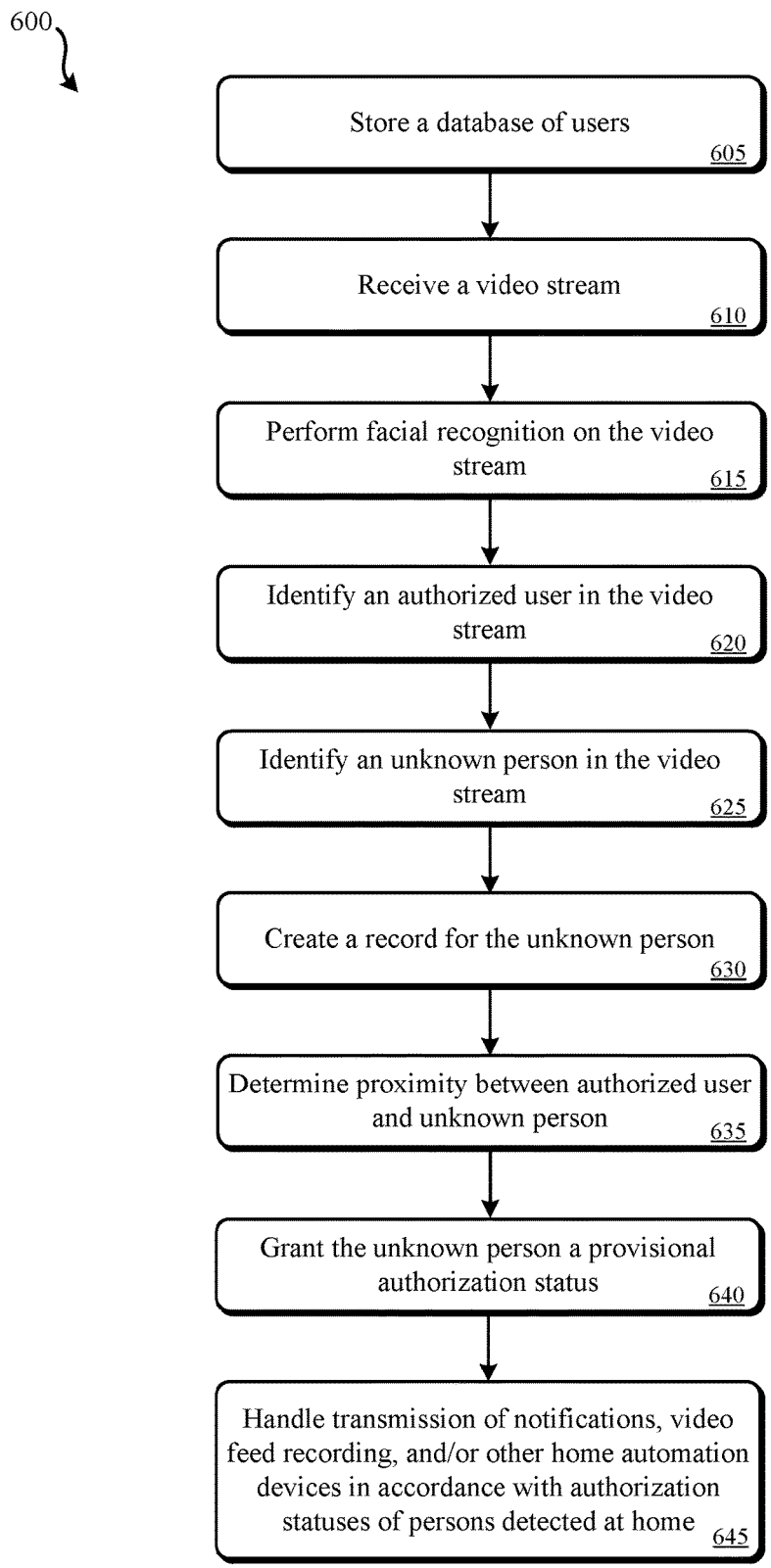
FIG. 6 illustrates an embodiment of a method for determining and setting an authorization level for an unknown person.

Various methods may be performed using the systems, devices, and interfaces detailed in relation to FIGS. 1-5. FIG. 6 illustrates an embodiment of a method for managing an authorization level for an unknown person. Each block of method 600 may be performed using a home automation host, such as home automation host 201 of FIG. 2. Such a home automation host may be implemented using a computerized device, such as overlay device 140 of FIG. 1, television receiver 170, a dedicated home automation host device, or another home automation device that can serve as a home automation host device.

At block 605, a database of users may be stored. Referring to FIG. 2, this database may be user database 220. User database 220 may include an entry for each authorized user and, as identified, entries for unknown persons. This user database may be updated as authorization levels are changed and/or are automatically granted and revoked.

At block 610, a video stream may be received from a video camera home automation device. This video camera may be positioned inside or outside of a home and may be used for security, facial recognition, and motion-detection purposes. This video stream may be analyzed locally by the video camera for facial recognition purposes or may be transmitted to a remote device, such as the home automation host, for performance of the facial recognition analysis and motion detection. The embodiment of method 600 illustrated assumes the facial recognition is being performed by the home automation host.

At block 615, the home automation host may perform facial recognition on the video stream. In response to motion being detected, the home automation device may determine if one or more persons are present and, if so, attempt to perform facial recognition on the one or more persons present. At block 620, by accessing the user database and retrieving visual identification data, and authorized user may be identified in the video stream on which facial recognition was performed at block 615. At block 625, an unknown person may be identified in the video stream. The unknown person may be identified as unknown based on no match being present within authorized user within the user database or the unknown person matching a record within the user database that is associated with an unknown person (e.g., the unknown person has been subject to facial recognition at the home before).

At block 630, assuming that the unknown person has not been subject to facial recognition at the home by the home automation host before, a new record may be created in the user database for the unknown person. Initially, this record may specify that the unknown person has no authorization level. Specifically how the unknown person is treated may be based on user preferences and rules defined and enforced at the home automation host for how a person without any authorization should be monitored and otherwise treated in and around the home. For example, the unknown person not having any authorization level may result in one or more notifications being sent to one or more authorized users about the presence of the unknown person, an alarm of a security system being sounded, and/or other home automation devices being managed based on the presence of the unknown person by the home automation host.

At block 635, physical and/or temporal proximity may be determined to be present by the home automation host between the authorized user identified at block 620 and the unknown person identified in the video stream at block 625. Physical and/or temporal proximity may be determined as previously detailed in this document.

At block 640, the unknown person may be granted a provisional or temporary authorization level. This authorization level may be used to update a record in the user database for the unknown person and may be used to determine the operation of the home automation host while the unknown person is in the vicinity. At block 645, the handling of the transmission of notifications, video feed recording, and/or the management of other home automation devices may be performed in accordance with the unknown person having the provisional authorization level. This provisional authorization level may result in the notifications transmitted to one or more authorized users and/or management of home automation devices being suppressed or handled differently due to the unknown person having at least some authorization. The specifics of the provisional authorization level may be defined by an authorized user at the home automation host. As an example, movement notifications of an unknown person having a provisional authorization level may not be pushed to one or more authorized users, whereas an unknown person having no authorization level may have movement notifications pushed to the one or more authorized users. Other examples of how an unknown person who has been granted a provisional authorization level may be handled by the home automation host include: one or more doors being unlocked for the unknown person; a home automation alarm system being disabled, shades may be raised, the unknown person may be permitted to actuate a garage door controller, a sound generation device may not output warning or alarm sounds, lights may be permitted to be controlled, etc. It should be understood that any of home automation devices of FIG. 1 may be controlled by the home automation host in manner different due to the provisional authorization level than if the unknown person has no authorization level. Additionally, the home automation host may enforce alternate rules in response to data received from home automation devices based on the unknown person's provisional authorization level that differ from rules enforced if the unknown person has no authorization level.

It should be understood that handling of the transmission of notifications, video feed recording, and/or the management of other home automation devices may be contingent on conditions more than just the provisional authorization level of the unknown person. For example, if a second unknown person is also present and this second unknown person has no authorization level, transmission of notifications, video feed recording, and/or the management of other home automation devices may be handled in accordance with preferences defined at the home automation host for when an unknown person is present has no authorization level. In some embodiments, authorizations may be "chained." That is, if a first unknown person is given provisional authorization based on proximity to an authorized user, a second unknown person may be given provisional authorization based on proximity to the first unknown person at a later time. Whether or not chained authorization is permissible may be defined by a user preference specified by an authorized user or a service provider to the home automation host.

Further, it should be understood that the handling of block 645 may be altered based on the provisional authorization level of the unknown person expiring or an authorized user providing or selecting an authorization level for the unknown person, such as via the user interface of FIG. 5.

Figure 7:
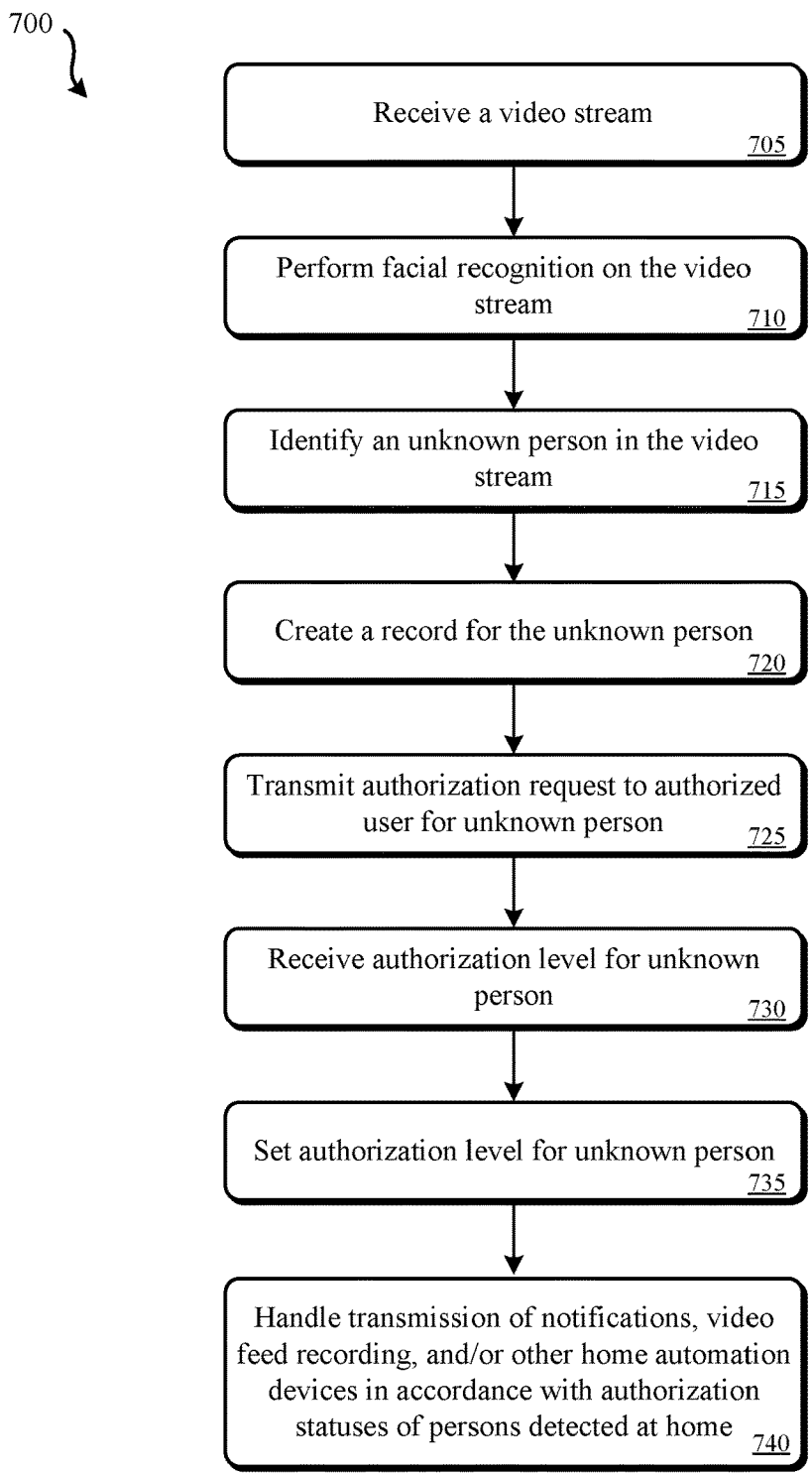
FIG. 7 illustrates an embodiment of a method for determining an authorization level for an unknown person based on input from an authorized user.

FIG. 7 illustrates an embodiment of a method 700 for determining an authorization level for an unknown person. Each block of method 700 may be performed using a home automation host, such as home automation host 201 of FIG. 2. Such a home automation host may be implemented using a computerized device, such as overlay device 140 of FIG. 1, television receiver 170, a dedicated home automation host device, or another home automation device that can serve as a home automation host device.

At block 710, a video stream may be received from a video camera home automation device. This video camera may be positioned inside or outside of a home and may be used for security, facial recognition, and motion-detection purposes. This video stream may be analyzed locally by the video camera for facial recognition purposes or may be transmitted to a remote device, such as the home automation host, for performance of the facial recognition analysis and motion detection. The embodiment of method 700 illustrated assumes the facial recognition is being performed by the home automation host.

At block 710, the home automation may perform facial recognition on the video stream. In response to motion being detected, the home automation device may determine if one or more persons are present and, if so, attempt to perform facial recognition on the one or more persons present.

At block 715, an unknown person may be identified in the video stream via the facial recognition process of block 710. The unknown person may be identified as unknown based on no match being present within authorized user having a record within the user database or the unknown person matching a record within the user database that is associated with an unknown person (e.g., the unknown person has been subject to facial recognition at the home before).

At block 720, assuming that the unknown person has not been subject to facial recognition at the home before or otherwise has an associated record, a new record may be created in the user database for the unknown person. Initially, this record may specify that the unknown person has no authorization level in may be treated as a stranger. Specifically how the unknown person is treated may be based on user preferences and rules defined and enforced at the home automation host. For example, the unknown person not having any authorization level may result in one or more notifications being sent to one or more authorized users about the presence of the unknown person, an alarm of a security system being sounded, and/or other home automation devices being managed based on the presence of the unknown person by the home automation host.

At block 725, an authorization request may be transmitted to an authorized user for the unknown person. Prior to block 725, depending on the defined user preferences at the home automation host, the unknown person may have been granted a provisional or temporary authorization level based on proximity as detailed in relation to method 600. Alternatively, authorization may be fully withheld until an authorized user is given the opportunity to respond to the authorization request of block 725. The authorization request of block 725 may be transmitted to an authorized user that was determined to be in proximity of the unknown person or may be transmitted to an authorized user that is defined in user preferences of the home automation host as being the administrator for authorization levels. The authorization request of block 725 may take the form of user interface 501. For example, the request may include an image of the unknown person captured from the video feed used to identify the person as unknown. The authorization request of block 725 may be sent to a mobile device associated with the authorized user who is selected or designated to respond. Alternatively, the authorization request may be provided via a television or other display device connected with or in communication with the home automation host. At block 730, the authorized user who received the request via a mobile device at block 725 may select an authorization level, such as via a user interface similar to the example of FIG. 5. The response may be transmitted to the home automation host and used to edit a record for the unknown person in the user database and, thus, set at the authorization level for the unknown person at block 735.

Block 725 may be performed at different times based on the embodiment of method 700. In some embodiments, block 725 may be performed as soon as the unknown person is identified at block 715. In other embodiments, block 725 is performed at a designated time each day, such as once per day for all unknown persons detected during the last 24 hours. In other embodiments, a provisional authorization is possibly granted for a defined period of time (e.g., in accordance with method 600) and block 725 is performed in relation to when the provisional authorization is set to expire, such as after or at the time of expiration or a defined amount of time prior to expiration.

At block 740, the handling of the transmission of notifications, video feed recording, and/or the management of other home automation devices may be performed in accordance with the unknown person having the authorization level set by the authorized user. This authorization level may result in the notifications transmitted to one or more authorized users and/or management of home automation devices being suppressed or handled differently due to the unknown person having a different level of authorization than prior to the authorized user's response.

Figure 8:
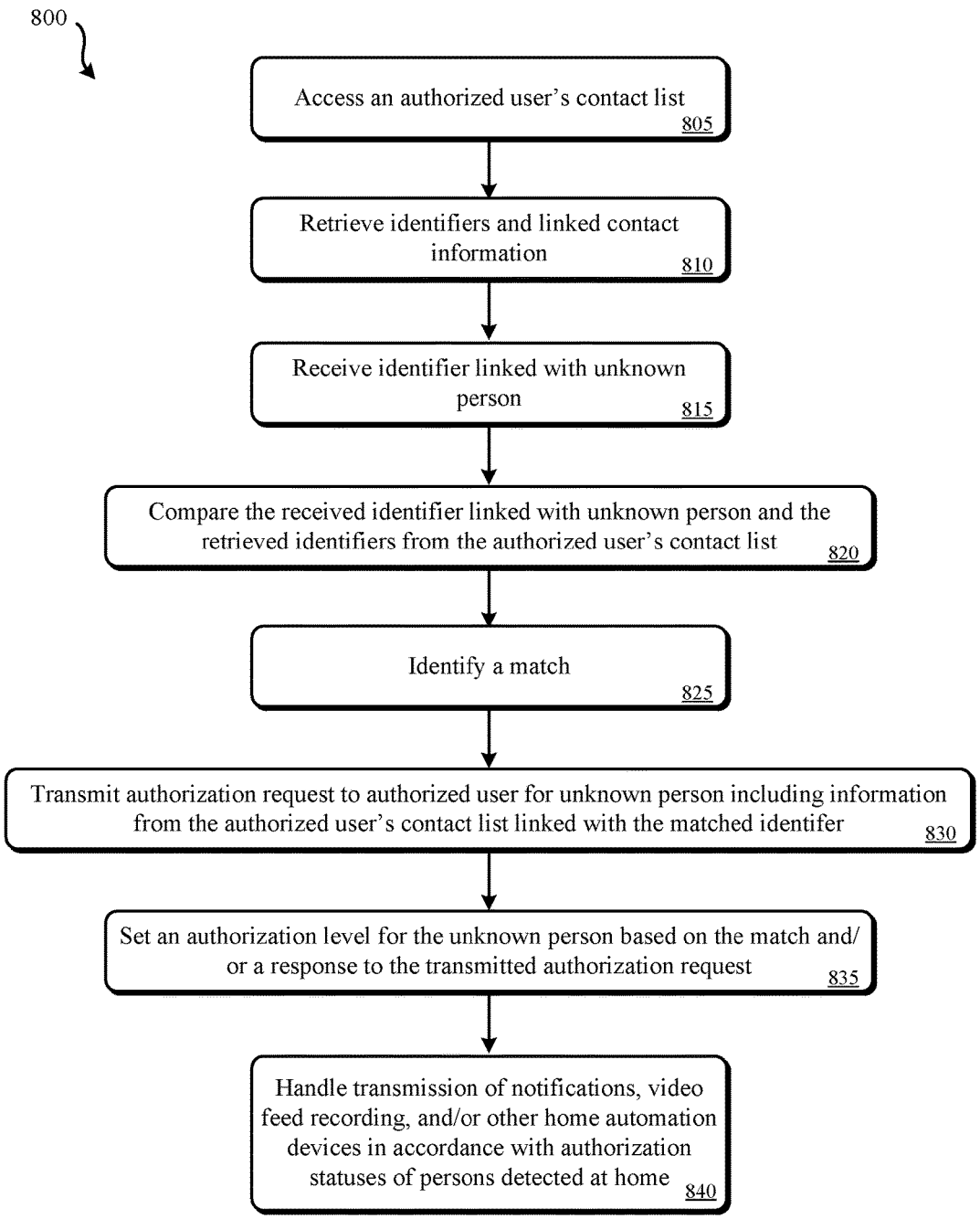
FIG. 8 illustrates an embodiment of a method for using an authorized user's contact list to augment a record of an unknown person.

FIG. 8 illustrates an embodiment of a method 800 for using an authorized user's contact list to augment a record of an unknown person. Each block of method 800 may be performed using a home automation host, such as home automation host 201 of FIG. 2. Such a home automation host may be implemented using a computerized device, such as overlay device 140 of FIG. 1, television receiver 170, a dedicated home automation host device, or another home automation device that can serve as a home automation host device. Alternatively, one or more blocks of method 800 may be performed by using a mobile device, such as mobile device 120 of FIG. 1 or mobile device 250 of FIG. 2.

At block 805, an authorized user's contact list may be accessed. The contact list may be accessed locally by a mobile device or may be retrieved by the home automation host or a cloud server associated with the home automation system. In some embodiments, the contact list is accessed and/or retrieved based on a user providing input that a context searches to be performed, such as via contact search 506 of user interface 501 of FIG. 5. At block 810, from the authorized user's contact list, identifiers and links contact information may be retrieved. The identifiers may be: telephone numbers, user names, images, social media handles, Mac addresses, Bluetooth addresses, or any other form of identifier that may be used to identify a particular person or mobile device. Links contact information, such as name, address, or business information may also be retried from the authorized user's contact list.

At block 815, an identifier associated with an unknown person may be received. This identifier may be received from a mobile device associated with the unknown person. This identifier may be of the types detailed in relation to block 810. The home automation host may determine that the mobile devices associated with the unknown person based on facial recognition of the unknown person being performed and an unknown mobile device being detected in the vicinity of the detected unknown person. In some embodiments, an application being executed by the mobile device of the unknown person may cause the mobile device to broadcast an identifier associated with the unknown person and/or the unknown person's mobile device. In some embodiments, the identifier transmitted by the mobile device of the unknown person may be in response to request for an identifier from the home automation host or some other home automation device that transmits an inquiry.

At block 820, a comparison may be performed between the received identifier and the identifiers retrieved from the authorized user's contact list. At block 825, a match may be identified. If a match is not identified at block 825, the unknown person may be handled in accordance with a default action defined at the home automation host, such as the unknown person being granted a provisional authorization level in accordance with method 600 and/or an authorization request being sent to an authorized user in accordance with method 700. It should be understood that blocks 810-825 may be performed by a home automation host or locally by a mobile device of an authorized user.

At block 830, the authorization request may be transmitted to a mobile device associated with an authorized user (as detailed in accordance with method 700) by the home automation host. The authorization request may be augmented with biographical information retrieved from the authorized user's contact list, such as the unknown person's name. The contact list used at block 805 may be of the same authorized user or a different authorized user as the authorized user who receives the authorization request at block 830.

Alternatively, if blocks 810-825 were performed using the mobile device of the authorized user, the authorization request may, still be received by the mobile device of the authorized user, but may be augmented with the information, such as biographical information for the unknown person, at the mobile device.

Blocks 835 and 840 may be performed in accordance with blocks 735 and 740 of method 700. In some embodiments, at block 835, the default authorization given to the unknown person may be raised if a match is present with a contact of the authorized user's contact list. That is, if the authorized user knows the unknown person well enough to be listed in his contact list, it can be expected that the unknown person is deserving of an increased level of authorization.

Figure 9:
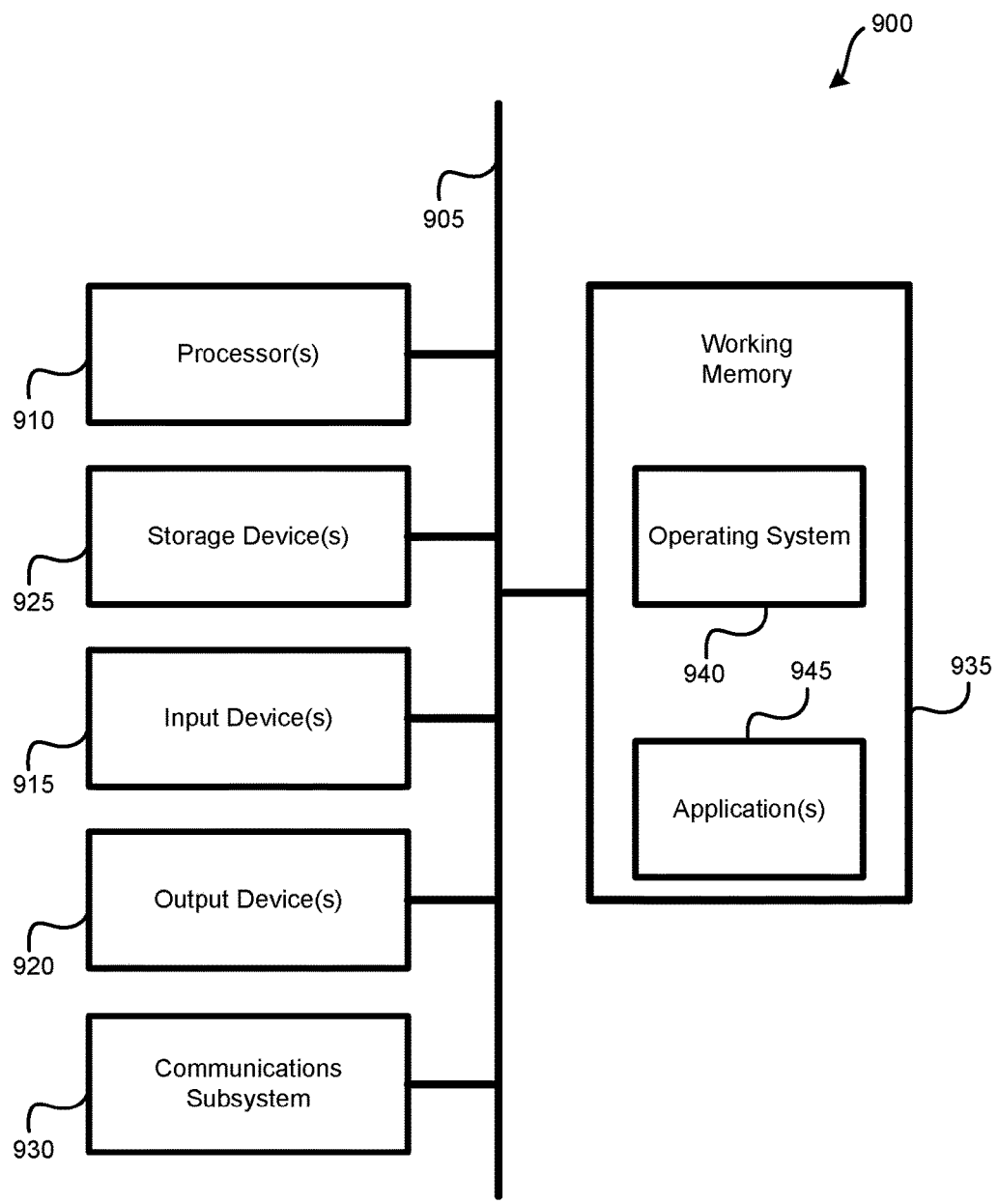
FIG. 9 illustrates a home automation computerized processing system.

FIG. 9 illustrates a home automation computerized processing system. A computer system as illustrated in FIG. 9 may be incorporated as part of the previously described computerized devices, such as the home automation host, any of the home automation devices, and/or the mobile devices. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a touchscreen, keyboard, remote control, and/or the like; and one or more output devices 920, which can include without limitation a display device, a printer, etc.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A home automation system comprising:
   a video camera that transmits a video stream to a home automation host system via wireless communication; and the home automation host system, comprising:
   a wireless communication interface;
   one or more processors; and
   a memory communicatively coupled with and readable by the one or more processors and having stored therein processor-readable instructions which, when executed by the one or more processors, cause the one or more processors to:
      store a database of users, wherein each user is linked with stored visual identification data used to identify the user in received video and an authorization level;
      receive the video stream from the video camera;
      perform facial recognition on a plurality of persons that appear in the video stream;
      identify, in the plurality of persons that appear in the video stream, an authorized user based on stored visual identification from the stored database of users;
      identify, in the plurality of persons that appear in the video stream, an unknown person;
      create a record for the unknown person in the database of users based on identifying the unknown person;
      determine proximity between the unknown person and the authorized user based on the received video stream;
      grant the unknown person a provisional authorization level based on the determined proximity between the unknown person and the authorized user in the received video stream; and
      suppress transmission of a notification indicating the presence of the unknown person based on the unknown person having been granted at least the provisional authorized status based on the proximity between the unknown person and the authorized user in the received video stream.

2. The home automation system of claim 1, wherein the proximity between the unknown person and the authorized user is a temporal proximity and wherein the processor-readable instructions, when executed, further cause the one or more processors to: determine that the temporal proximity between the unknown person and the authorized user in the video stream is less than a threshold period of time.

3. The home automation system of claim 1, wherein the proximity between the unknown person and the authorized user is a physical proximity and wherein the processor-readable instructions, when executed, further cause the one or more processors to: determine, based on the video stream, that the authorized user and the unknown person appear in a field of view of the video camera at a same time.

4. The home automation system of claim 1, wherein the processor-readable instructions, when executed, further cause the one or more processors to:
   capture an image of the unknown person from the received video stream; and
   store the image of the unknown person as part of the created record for the unknown person in the database of users.

5. The home automation system of claim 4, wherein the processor-readable instructions, when executed, further cause the one or more processors to:
   output, for presentation to the authorized user, via a user interface, information, comprising the image, from the record for the unknown person;
   output a request that requests the authorized user input an updated authorization level for the unknown person;
   receive, via the user interface, a response to the request, the response comprising an indication of the updated authorization level for the unknown person; and
   modify the created record for the unknown person to indicate the updated authorization level provided in the response to the request.

6. The home automation system of claim 1, wherein the processor-readable instructions, when executed, further cause the one or more processors to:
   cease recording of the video stream based on the unknown person having been granted at least the provisional authorized status based on the proximity between the unknown person and the authorized user.

7. The home automation system of claim 1, wherein the processor-readable instructions, when executed, further cause the one or more processors to:
   access a contact list of a first mobile device, the first mobile device being linked with the authorized user in the database of users, wherein the contact list comprises a plurality of identifiers linked with a plurality of persons;
   receive an identifier from a second mobile device, the second mobile device being linked with the unknown person;
   determine the identifier received from the second mobile device matches an identifier of the plurality of identifiers of the accessed contact list; and
   update the record for the unknown person to include a name for the unknown person obtained from the contact list, the name for the unknown person being linked in the contact list with the identifier of the plurality of identifiers of the accessed contact list.

8. The home automation system of claim 1, wherein the processor-readable instructions, when executed, further cause the one or more processors to:
   revoking the provisional authorization level of the unknown person based on the unknown person not being detected within proximity of any authorized user in the received video stream for at least a threshold duration of time and the unknown person not having been granted any permanent authorized status.

9. A method for determining and setting an authorization level for an unknown person, the method comprising:
   storing, by a home automation host system, a database of users, wherein each user is linked with stored visual identification data used to identify the user in received video and the authorization level;
   receiving, by the home automation host system, a video stream from a video camera;
   performing, by the home automation host system, facial recognition on a plurality of persons that appear in the video stream;
   identifying, by the home automation host system, in the plurality of persons that appear in the video stream, an authorized user based on stored visual identification from the stored database of users;
   identifying, by the home automation host system, in the plurality of persons that appear in the video stream, the unknown person;
   creating, by the home automation host system, a record for the unknown person in the database of users based on identifying the unknown person;
   determine, by the home automation host system, proximity between the unknown person and the authorized user based on the received video stream;
   setting, by the home automation host system, a provisional authorization level for the unknown person based on the determined proximity between the unknown person and the authorized user in the received video stream, wherein the provisional authorization level alters a distribution of notifications related to the unknown person;

capturing, by the home automation host system, an image of the unknown person from the received video stream;

storing, by the home automation host system, the image of the unknown person as part of the created record for the unknown person in the database of users;

outputting, by the home automation host system, to a mobile device for presentation to the authorized user, the created record for the unknown person, wherein the image of the unknown person from the record is output for presentation to the authorized user;

outputting, by the home automation host system, a request that requests the authorized user input an updated authorization level for the unknown person;

receiving, by the home automation host system, a response to the request, the response comprising an indication of an updated authorization level for the unknown person; and modifying, by the home automation host system, the created record for the unknown person to indicate the updated authorization level provided in the response to the request.

10. The method for determining and setting the authorization level for the unknown person of claim 9, wherein the proximity between the unknown person and the authorized user is a temporal proximity and the method further comprises: determining that the temporal proximity between the unknown person and the authorized user in the video stream is less than a threshold period of time.

11. The method for determining and setting the authorization level for the unknown person of claim 9, wherein the proximity between the unknown person and the authorized user is a physical proximity and the method further comprises, based on the video stream, that the authorized user and the unknown person appear in a field of view of the video camera at a same time.

12. The method for determining and setting the authorization level for the unknown person of claim 9, further comprising:
suppressing, by the home automation host system, transmission of a notification indicating the presence of the unknown person based on the unknown person having been granted at least the provisional authorization level based on the proximity between the unknown person and the authorized user in the received video stream.

13. The method for determining and setting the authorization level for the unknown person of claim 9, further comprising:
ceasing, by the home automation host system, recording of the video stream based on the unknown person having been granted at least the provisional authorization level based on the proximity between the unknown person and the authorized user.

14. A non-transitory processor-readable medium, comprising processor-readable instructions that cause one or more processors to:
store a database of users, wherein each user is linked with stored visual identification data used to identify the user in received video and an authorization level;
receive a video stream from a video camera that operates as part of a home automation system;
record the video stream from the video camera;
perform facial recognition on a plurality of persons that appear in the video stream;
identify, in the plurality of persons that appear in the video stream, an authorized user based on stored visual identification from the stored database of users;
identify, in the plurality of persons that appear in the video stream, an unknown person;
create a record for the unknown person in the database of users based on identifying the unknown person;
determine proximity between the unknown person and the authorized user based on the received video stream; and
grant the unknown person a provisional authorization level based on the determined proximity between the unknown person and the authorized user in the received video stream; and
cease to record the video stream based on the unknown person having been granted at least the provisional authorization level based on the proximity between the unknown person and the authorized user.

15. The non-transitory processor-readable medium of claim 14, wherein the proximity between the unknown person and the authorized user is a temporal proximity and wherein the processor-readable instructions further cause the one or more processors to determine that the temporal proximity between the unknown person and the authorized user in the video stream is less than a threshold period of time.

16. The non-transitory processor-readable medium of claim 14, wherein the proximity between the unknown person and the authorized user is a physical proximity and wherein the processor-readable instructions further cause the one or more processors to determine, based on the video stream, that the authorized user and the unknown person appear in a field of view of the video camera at a same time.

17. The non-transitory processor-readable medium of claim 14, wherein the processor-readable instructions further cause the one or more processors to:
output, for presentation to the authorized user, the created record for the unknown person, wherein an image of the unknown person is output for presentation to the authorized user;
output a request that requests the authorized user input an updated authorization level for the unknown person;
receive, via a user interface, a response to the request, the response comprising an indication of the updated authorization level for the unknown person; and
modify the created record for the unknown person to indicate the updated authorization level provided in the response to the request.

* * * * *